US007668879B2

(12) United States Patent
Vivian et al.

(10) Patent No.: US 7,668,879 B2
(45) Date of Patent: Feb. 23, 2010

(54) DATABASE SYSTEM CONFIGURED FOR AUTOMATIC FAILOVER WITH NO DATA LOSS

(75) Inventors: Stephen John Vivian, Londonderry, NH (US); Robert R. McGulrk, Nashua, NH (US); George H. Claborn, Amherst, NH (US); Mahesh Baburao Girkar, Cupertino, CA (US); Benedito Elmo Garin, Jr., Hudson, NH (US); Raymond Guzman, Amherst, NH (US); Douglas Voss, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 133 days.

(21) Appl. No.: 11/603,503

(22) Filed: Nov. 22, 2006

(65) Prior Publication Data
US 2007/0124347 A1 May 31, 2007

(51) Int. Cl.
*G06F 12/00* (2006.01)
(52) U.S. Cl. .............................. 707/204; 707/8; 707/10; 707/202; 707/205; 714/4; 714/770; 709/204
(58) Field of Classification Search ...................... 707/1, 707/10, 100–102, 104.1, 8, 201, 204, 205; 714/4, 770; 709/204
See application file for complete search history.

(56) References Cited

U.S. PATENT DOCUMENTS

| | | | |
|---|---|---|---|
| 5,765,172 A * | 6/1998 | Fox | 707/204 |
| 5,991,766 A * | 11/1999 | Sadiq et al. | 707/103 R |
| 6,360,331 B2 * | 3/2002 | Vert et al. | 714/4 |
| 6,564,336 B1 * | 5/2003 | Majkowski | 714/4 |
| 7,058,853 B1 * | 6/2006 | Kavanappillil et al. | 714/13 |
| 7,058,958 B1 * | 6/2006 | Shutt et al. | 719/328 |
| 7,290,017 B1 * | 10/2007 | Wang et al. | 707/204 |
| 7,457,829 B2 * | 11/2008 | East et al. | 707/202 |
| 2001/0008019 A1 * | 7/2001 | Vert et al. | 714/1 |

(Continued)

OTHER PUBLICATIONS

"Delayed Internet Routing Convergence"—Craig Labovitz, Abha Ahuja, Abhijit Bose and Farnam Jahanian—IEEE/ACM Transactions on Networking (TON), vol. 9, issue: 3, 2001 IEEE/ACM (pp. 293-306).*

(Continued)

*Primary Examiner*—Jean B. Fleurantin
*Assistant Examiner*—Anh Ly
(74) *Attorney, Agent, or Firm*—Gordon E. Nelson

(57) ABSTRACT

Techniques used in an automatic failover configuration having a primary database system, a standby database system, and an observer for preventing divergence among the primary and standby database systems while increasing the availability of the primary database system. In the automatic failover configuration, the primary database system remains available even in the absence of both the standby and the observer as long as the standby and the observer become absent sequentially. The failover configuration further permits automatic failover only when the observer is present and the standby and the primary are synchronized and inhibits state changes during failover. The database systems and the observer have copies of failover configuration state and the techniques include techniques for propagating the most recent version of the state among the databases and the observer and techniques for using carefully-ordered writes to ensure that state changes are propagated in a fashion which prevents divergence.

20 Claims, 12 Drawing Sheets

U.S. PATENT DOCUMENTS

| | | | |
|---|---|---|---|
| 2002/0004796 A1* | 1/2002 | Vange et al. | 707/10 |
| 2002/0026604 A1* | 2/2002 | Bissett et al. | 714/12 |
| 2002/0188711 A1* | 12/2002 | Meyer et al. | 709/223 |
| 2004/0010502 A1* | 1/2004 | Bomfim et al. | 707/100 |
| 2004/0267809 A1* | 12/2004 | East et al. | 707/104.1 |
| 2005/0102603 A1* | 5/2005 | Tapper et al. | 714/770 |
| 2005/0165858 A1* | 7/2005 | Tom et al. | 707/201 |
| 2005/0216462 A1* | 9/2005 | Xiao | 707/8 |
| 2005/0240806 A1* | 10/2005 | Bruckert et al. | 714/6 |
| 2006/0053164 A1* | 3/2006 | Ewing et al. | 707/104.1 |
| 2006/0053183 A1* | 3/2006 | Eaton et al. | 707/204 |
| 2006/0089935 A1* | 4/2006 | Clifford et al. | 707/10 |
| 2006/0101081 A1* | 5/2006 | Lin et al. | 707/200 |
| 2006/0117212 A1* | 6/2006 | Meyer et al. | 714/4 |
| 2006/0149797 A1* | 7/2006 | Chai et al. | 707/204 |
| 2006/0149997 A1* | 7/2006 | Chai et al. | 714/6 |
| 2006/0167883 A1* | 7/2006 | Boukobza | 707/10 |
| 2006/0235889 A1* | 10/2006 | Rousseau et al. | 707/104.1 |
| 2006/0253727 A1* | 11/2006 | Leveille et al. | 714/4 |
| 2006/0294038 A1* | 12/2006 | Grossfeld et al. | 707/1 |
| 2007/0096894 A1* | 5/2007 | Lemmon | 340/506 |
| 2007/0143375 A1* | 6/2007 | Tom et al. | 707/204 |
| 2007/0180289 A1* | 8/2007 | Chai et al. | 714/4 |
| 2007/0198710 A1* | 8/2007 | Gopalakrishnan | 709/225 |
| 2008/0091737 A1* | 4/2008 | Lee et al. | 707/200 |

OTHER PUBLICATIONS

Unification of replication and transaction processing in three-tier architecture—Zhao, W. Moser, L.E. and Melliar-Smith, P.M.—Distributed Computing Systems, 2002, Proceedings, $22^{nd}$ International Conference Jul. 2-5, 2002 (pp. 290-297).*

Ron Talmage, "Database Mirroring in SQL Server 2005", published Apr. 1, 2005, http://www.microsoft.com/technet/prodtechnol/sql/2005/dlbmirror.mspx.

* cited by examiner

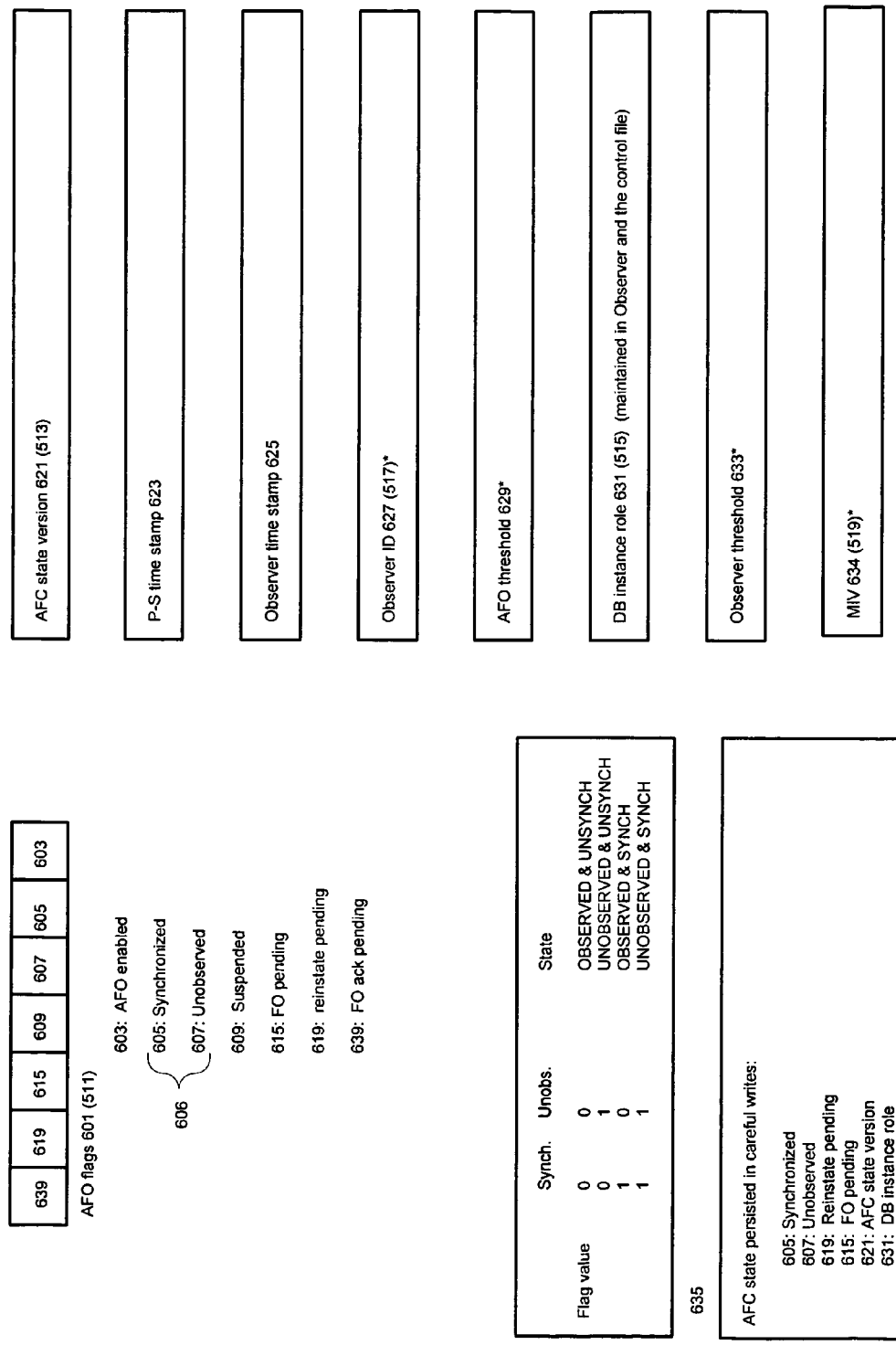

Observer messages 703

| message 705 from observer 503 | Observer OBID 707 | Observer state version no. 709 | Observer AFO flags 711 | MIV 713 |

| reply 715 to observer 503 | Recipient state version no. 717 | Recipient AFO flags 719 | Recipient status 721 |

| Ready to failover? message 723 from Observer 503 to Standby | Observer OBID 707 | Observer state version no. 709 | Observer AFO flags 711 | MIV 713 |

| Reply 725 from Standby | Status 727 |

| State change Ack message 729 from Observer to Primary | Observer OBID 707 | Observer state version no. 709 |

Database system messages 731

| Message from Primary 733 | Sender AFO flags 735 | Sender state version no. 737 | Observer OBID 739 | Presumed recipient role 741 | flags 743 |

| Reply from Standby 745 | Replier AFO flags 747 | Replier state version no. 749 | Observer OBID 751 | Actual recipient role 753 | flags 755 |

AFC state messages 701

_Fig. 7_

| Transition description | Transition number | AFC state 506 change | Initiator | Participant requiring quorum | Quorum source | Ack req'd | Ack source | Order of writes |
|---|---|---|---|---|---|---|---|---|
| | 902 | 905 | 907 | 909 | 911 | 913 | 914 | 915 |
| Manual failover | 409, 410 | FAILOVER PENDING | DBA | stdby | Observer | yes | Observer | observer, stdby |
| Automatic failover | 414 | FAILOVER PENDING | Observer | Observer | stdby | yes? | stdby | stdby, observer |
| New primary after failover; Standby not yet reinstated | 406 | SYNCH→UNSYNCH, state ver. no, done w/ FAILOVER PENDING | stdby | none (change protected by failover pending) | — | no | — | stdby, others via pings |
| Primary boots up | 404 | SYNCH→UNSYNCH, state ver. no, done on boot by primary | primary | primary | others | yes | others | others via pings, primary via ack |
| Standby detects gap in redo data | 413, 436 | SYNCH→UNSYNCH, state vers. no | stdby | primary | stdby | no | — | stdby, others via pings |
| Primary detects loss of synchronization in OBS SYNCH | 415 | SYNCH→UNSYNCH, state vers. no | primary | primary | others | yes | others | others via pings, primary via ack |
| Standby catches up to primary | 416, 439 | UNSYNCH→SYNCH, state vers. no | primary | stdby | others | no | — | primary, others via pings |
| Observer becomes absent when both primary and standby are present | 419, 429 | OBS→UNOBS | primary | both | primary for stdby, stdby for primary | for primary only | stdby for primary | stdby, primary via pings |
| Primary detects return of the Observer | 420, 427 | UNOBS→OBS | primary | stdby | primary | no | — | primary, stdby via ping |
| Observer returns with or without standby | 425 | SYNCH→UNSYNCH, state vers. no | primary | primary | others | yes | others | others via pings, primary via ack |
| Standby returns without Observer | 433 | SYNCH→UNSYNCH, state vers. no, OBS→UNOBS | primary | primary | stdby | yes | stdby | stdby via ping, primary via ack |
| Primary detects loss of synchronization in UNOBS SYNCH | 437 | SYNCH→UNSYNCH, state vers. no | primary | none | — | no | — | primary, others via pings as they return |

| Configuration state | AFO permitted? | P and S synchronized? | P stalls in absence of S only | P stalls in absence of both O and S |
|---|---|---|---|---|
| OBSERVED SYNCHRONIZED 411 | yes | yes | no[1] | yes |
| OBSERVED UNSYNCHRONIZED 421 | no | no | no | no |
| UNOBSERVED SYNCHRONIZED 435 | no | yes | no | no[2] |
| UNOBSERVED UNSYNCHRONIZED 441 | no | no | no | no |

1. Primary can transition to OBSERVED UNSYNCHRONIZED if O is present.
2. Primary can transition to UNOBSERVED UNSYNCHRONIZED on its own.

Fig. 12

DATABASE SYSTEM CONFIGURED FOR AUTOMATIC FAILOVER WITH NO DATA LOSS

BACKGROUND OF THE INVENTION

1. Field of the Invention

The present invention relates generally to database management systems and more particularly to techniques for doing automatic failover from a primary database server to a standby database server.

2. Description of Related Art

As government and business store increasing amounts of data in database systems, there are increasing demands to have such data always available, even in the face of catastrophic failure of computer hardware, network outage, disastrous data corruption, etc. To meet these requirements database system engineers have developed database system configurations in which database data is replicated in more than one database system. Once data is replicated from one database system to another, if the first database system becomes absent from the configuration, the second database is used for processing database requests. The term absent is used here for any situation in which other participants in a configuration lose contact with a particular participant. Absence may be caused, for example, by failure of the absent participant or by failure of communications links between the absent participant and other participants. The process of switching from an absent first database system to a second database system is commonly known as failover.

Replicating a Database in a Standby Database

Replication features such as those just described are available under the name Oracle Data Guard in relational database systems manufactured by Oracle Corporation of Redwood City, Calif.

FIG. 1 shows a database system that uses Data Guard to replicate data to multiple standby databases across a network. Replicated database system 101 contains primary database 103 and two standby databases 113 and 121. Primary database 103 contains database information including database tables and metadata. Updates made to the primary database 103 are transmitted via network 105 to replication system 108, which replicates the updates in database 113 and/or to replication system 110, which replicates the updates in database 121. In both replication systems, what is transmitted via network 105 is updates in the form of redo data 107. The redo data is then stored in redo log files 109. Redo log files 109 are files that contain redo data records. Redo data records record data that the database system can use to reconstruct all changes made to the primary database 103, including changes that have not yet been committed (made permanent). For example, if a balance value in a bank_balance table changes, the database system generates a redo data record containing a change vector that describes the change to the database. When the redo data is used to recover the database system, the database system reads the change vectors in the redo data records and applies the changes recorded in the vectors to the database.

The redo data may be applied either physically or logically against a standby database. Redo data is a physical copy of the data produced in primary database 103 as a result of the change. When redo data is applied physically against a standby database, as shown at 111 and 113, standby database 113 is physically identical to primary database 103, that is, it has data structures which are identical on a disk block by disk block basis to those in primary database 103 and the redo data is applied as it comes from primary database 103 to database 113.

When redo data is applied logically against a standby database, as shown at 115-121, standby database 121 is logically identical to primary database 103, that is, an SQL statement will have the same result when applied either to primary database 103 or logical standby database 121. When redo data is applied logically, the redo data is transformed into the SQL statements that produced the changes recorded in the redo data, as shown at 115 and 117, and the SQL statements are then executed on logical standby database 121, as shown at 119.

An Oracle database system 101 using Data Guard can be run in three distinct protection modes:

Maximum Protection
  This mode offers the highest level of data protection. Redo data 107 is synchronously transmitted (SYNC) to standby database system 108 or 110 from the primary database 103, and transactions are not committed on primary database 103 until the standby database indicates to the primary database that it has the redo data. When no standby database can do this, the primary database must stop processing. As long as the primary database system is processing data in maximum protection mode, there will be no loss of redo data.

Maximum Availability
  This also guarantees no loss of redo data at least so long as primary database 103 and standby database 113 or 121 remain synchronized with each other with respect to the redo data that is available to each. However, if standby database system 108 or 110 becomes absent, processing continues on primary database 103. Thus the primary and that standby are no longer synchronized with each other—the primary has generated redo data that is not yet available to the standby. When the fault is corrected, standby database 113 or 121 is resynchronized with primary database 103. If a failover occurs before the standby database is resynchronized with the primary database, some data may be lost.

Maximum Performance
  This mode offers slightly less data protection to primary database 103, but higher potential performance for the primary than does the maximum availability mode. In this mode, as primary database 103 processes transactions, redo data 107 is asynchronously transmitted (ASYNC) to standby database system 108 or 110. The commit operation on primary database 103 does not wait for standby database system 108 or 110 to acknowledge receipt of redo data 107 before completing write operations on primary database 103. If any standby destination 113 or 121 becomes absent, processing continues unabated on primary database 103. There is little impact on primary database 103 performance due either to the overhead of asynchronously transmitting redo data or to the loss of the standby.

Automatic Failover

If the primary database system and the standby database system are synchronized with each other and the primary database system becomes absent, an automatic failover may occur. In the automatic failover, the standby database becomes the primary database and when the former primary database has recovered, the former primary may become the new standby. FIG. 2 presents a schematic overview of how automatic failover works.

An exemplary implementation of a database system employing automatic failover was disclosed by Microsoft Corporation in 2004. The following schematic is based on that implementation. A normally functioning replicated database system is shown at 203. The replicated database system 203 has a primary database 202 and standby database 211. In the Microsoft Corporation implementation, both the primary and standby databases run on SQL servers. Additionally, the replicated database system includes a witness or observer 209. The witness or observer and the two database systems are in contact with and monitor each other, as shown by arrow 213. In the Microsoft Corporation system, the witness or observer is another SQL server; the server need not, however, have a database system mounted on it. In the following, the primary database system, standby database system, and the witness or observer are termed the failover participants.

The function of the witness or observer (in the following simply "Observer") in the Microsoft Corporation implementation of automatic failover and in such implementations generally is to provide an entity in addition to the primary and standby databases which can help the standby or primary database determine either whether a role change has already occurred or whether a role change is now necessary. For example, both the standby and the Observer monitor the primary database system, and if the primary database system becomes absent, the standby database system may have to perform an automatic failover. The standby database system will not, however, perform the automatic failover unless the Observer has confirmed that the primary is absent. In general terms, the process of one participant in the configuration obtaining confirmation from another participant in the configuration before changing the current state of the configuration is termed obtaining a quorum for the state change. Thus, in general terms, the function of the observer is to make it possible for either the primary or the standby to obtain a quorum for a state change when the other is not available.

When the replicated database system is functioning as shown at 203, primary database 202 is forwarding redo data 215 to redo log files 109 and the redo data is being applied to standby database 211 (arrow 215). During normal functioning of the replicated database as shown at 203, primary database 202 fails. At 205 is shown how the replicated system fails over from failed primary database 202 to standby or failover target database 211. Because database 202 has failed such that Observer 209 no longer is in communication with database 202, Observer 209 is in communication only with database 211, as shown by arrow 217 and database 202 has ceased sending database 211 redo data. If Observer 209 has also noted that database 202 has failed, there is a quorum for automatic failover and standby database 211 can perform the failover. Upon failover, applications that would be attached to failed primary database 202 are re-attached to the new primary database 211 instead. Modifications to the new primary database 211 are stored in redo log files in the usual fashion. At 207 is shown what happens when Observer 209 notes that database 202 has become available again. Observer 209 now has communication with both database systems, as shown by arrow 213(*iii*). Working together, new primary server 211 and Observer 209 recover failed primary 202 such that it may serve the new primary as its standby server. At this point, database 211 is the primary database and database 202 the standby database. Redo data 219 flows from database 211 to database 202, as shown by arrow 219.

A serious concern in the design of database systems that do automatic failover is ensuring that the automatic failover does not result in divergence between the primary and standby databases. The databases have diverged when there are differences between the databases which cannot be reconciled without the loss of data in one or the other of the databases. There are two situations in which failover may result in diverging databases:
1. At the time of the failover, some of the redo data generated by the absent primary prior to its absence has not reached the standby; or
2. the failover has caused the former standby to become the primary and the absent primary does not realize that the failover has occurred and again begins to generate redo data. This situation, in which two primary database systems are generating different streams of redo data, is termed the split brain syndrome.

In the Microsoft automatic failover system of FIG. 2, divergence resulting from automatic failover is prevented by having the primary cease processing transactions whenever no quorum is available, i.e., whenever both the standby and the witness are unavailable. The primary ceases processing transactions even though it is perfectly capable of continuing to process them, albeit at the risk of some loss of redo data because the redo being produced by the primary cannot be immediately sent to the standby. In the following, a primary which ceases processing transactions in order to prevent divergence is said to have stalled. As can be seen from the foregoing, there is a tradeoff in systems with automatic failover between divergence prevention and availability of the primary database system.

While automatic failover is conceptually simple, there are many difficulties at the detailed design level. Among them are:
  designing a system with automatic failover such that divergence is prevented and availability of the primary is maximized.
  managing automatic failover so that divergence cannot occur.
  managing state changes generally in the system so that divergence cannot occur.
  minimizing the resources required for the observer.
  propagating the current configuration state among the failover participants.

It is an object of the invention disclosed herein to provide solutions for these and other problems in the design of replicating database systems that perform automatic failover.

BRIEF SUMMARY OF THE INVENTION

The object is attained in one aspect by an automatic failover configuration that has participants including a primary database system that processes transactions and produces redo data, a standby database system that receives the redo via a communications link, and an observer, and system state specifiers. The system state specifiers prevent divergence of the database systems as a result of automatic failover while permitting the primary database system to continue to process redo data when both the observer and the standby database system are absent as long as the observer and the standby database system became absent sequentially.

Other objects and advantages will be apparent to those skilled in the arts to which the invention pertains upon perusal of the following Detailed Description and drawing, wherein:

BRIEF DESCRIPTION OF THE SEVERAL VIEWS OF THE DRAWINGS

FIG. 6 shows the AFC state in a preferred embodiment;

FIG. 7 shows the messages used in a preferred embodiment;

FIG. 9 shows a summary of the preferred embodiment's state transitions;

FIG. 12 is a table showing operations that are possible in the AFC states.

DETAILED DESCRIPTION OF THE INVENTION

The following Detailed Description will begin with the discussion of the automatic failover system disclosed in U.S. Ser. No. 11/289,974; this automatic failover system is termed in the following the "Fast Start Failover System", or FSFO. The Description will then generalize the discussion by disclosing the state machine which determines the behavior of the fast start failover participants in U.S. Ser. No. 11/289,974, disclosing the configuration state which is shared by the fast start failover participants and which implements the state machine, and disclosing the general techniques employed to form a quorum, to propagate configuration state, and to avoid divergence. The Description finally discloses details of the state transitions in a preferred embodiment.

Fast-Start Failover System

Figure 1:
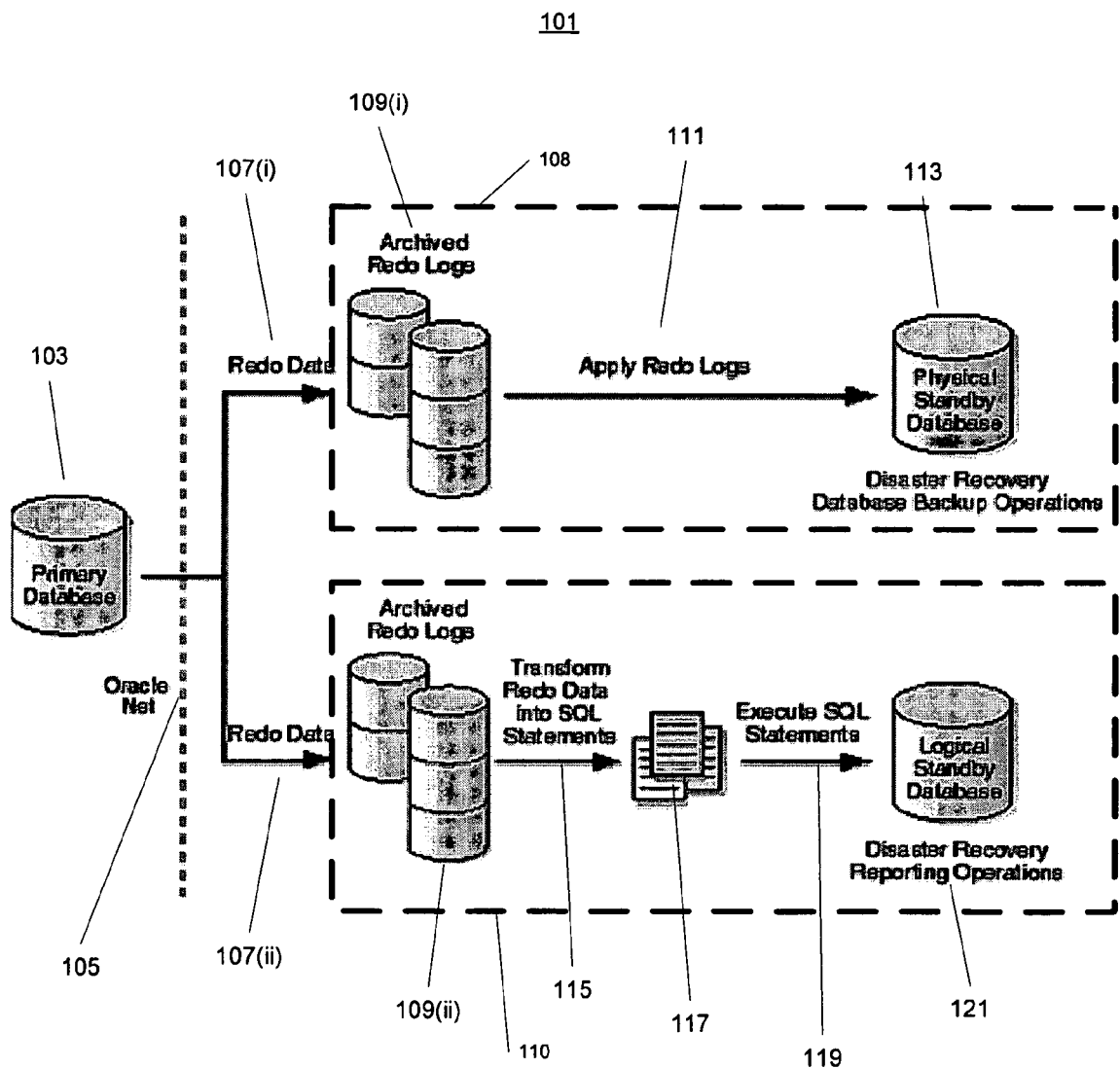
FIG. 1 shows a prior-art database system that is replicating data to multiple standby database systems across a network.
Figure 2:
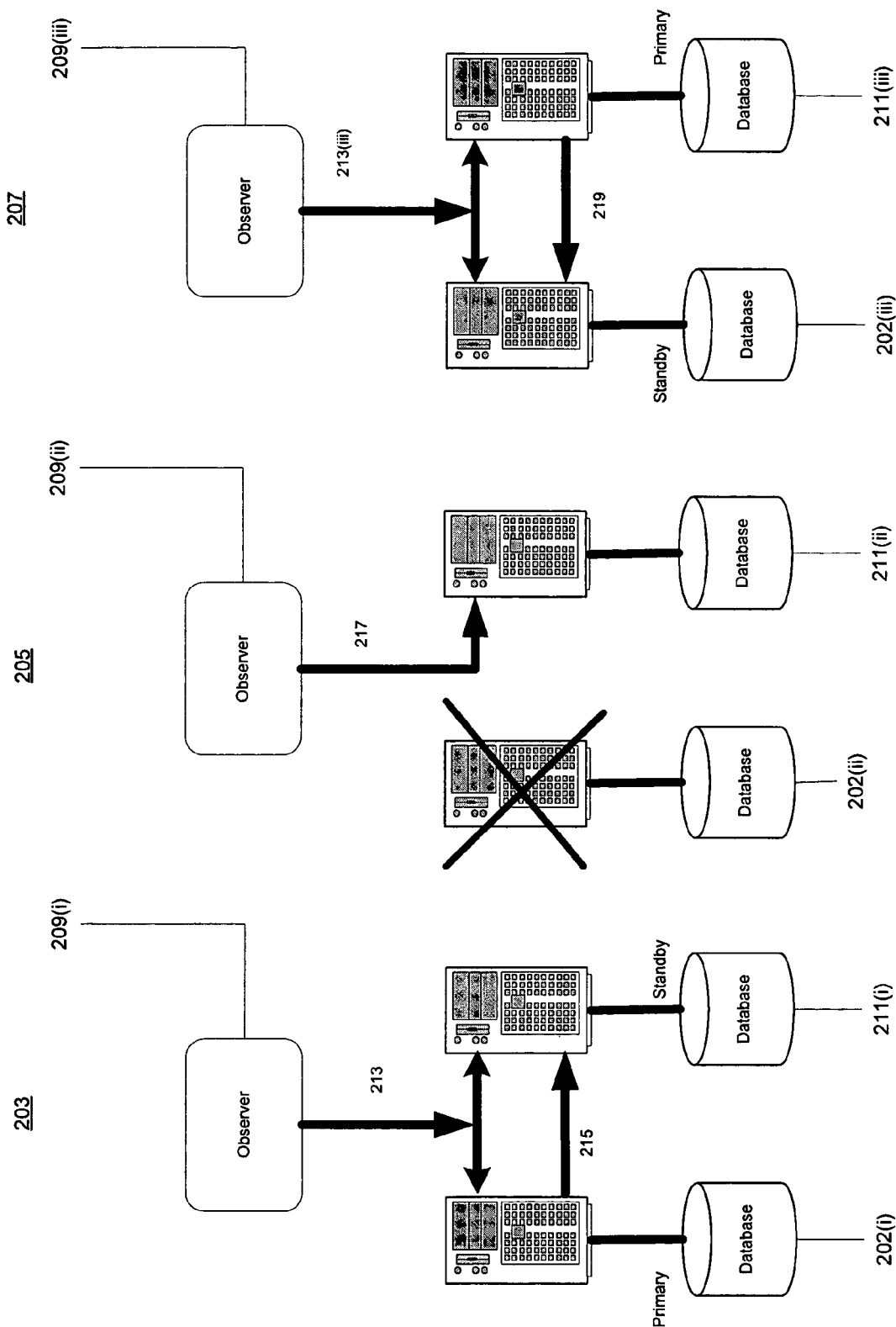
FIG. 2 shows a prior-art technique for providing failover of a replicated database system.
Figure 3:
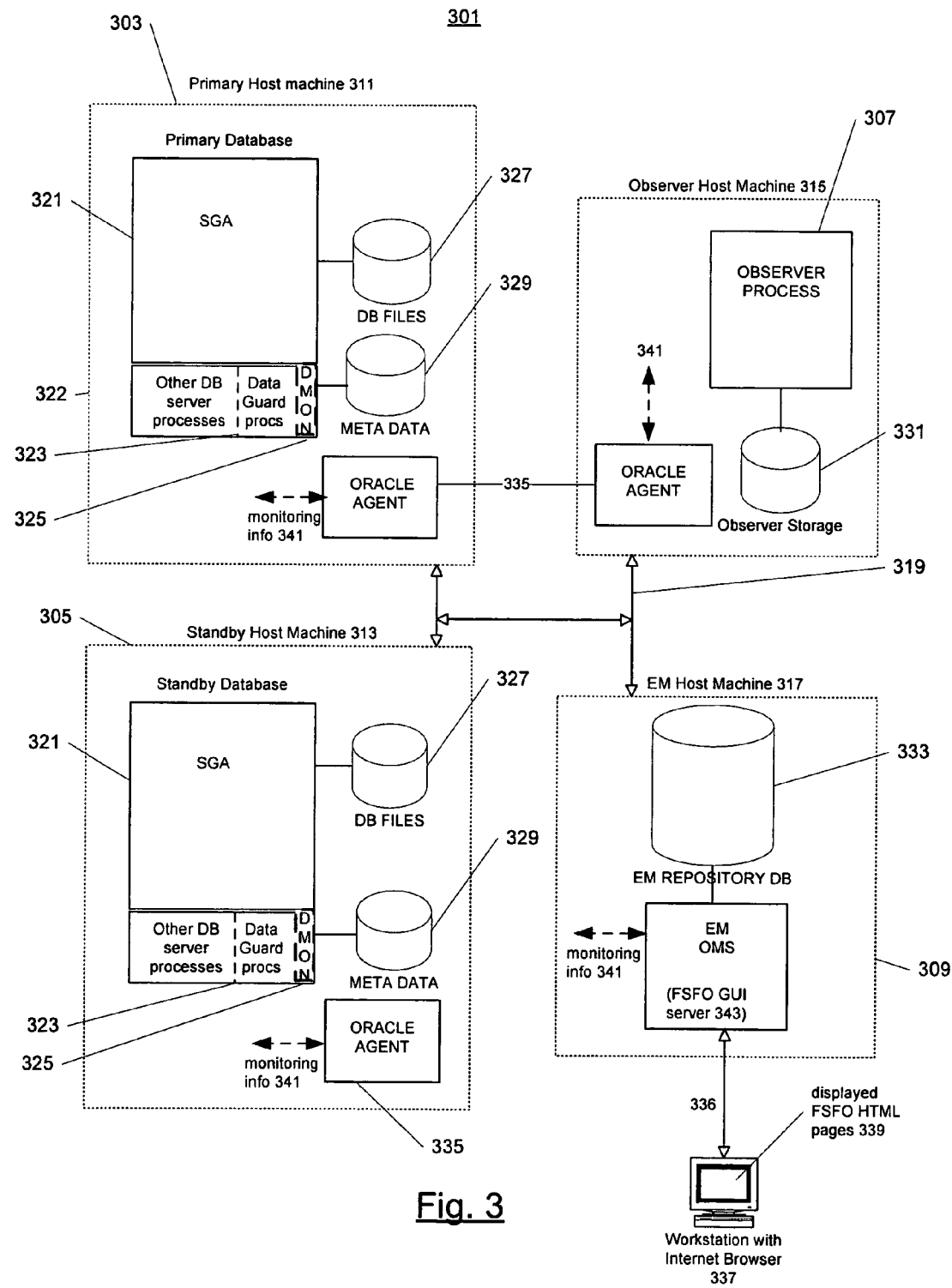
FIG. 3 shows the components of a database system which may be configured for automatic failover.

FIG. 3 shows the relationship between components of a system of databases manufactured by Oracle Corporation that has been configured for automatic failover. Fast-Start Failover system 301 includes a primary database system 303, any number of standby database systems 305, and Observer process 307. It may optionally also include Oracle Enterprise Manager (EM) host machine 317, which includes a repository 333 of information about the configuration and supports a graphical user interface for configuring system 301 and observing its status. Each of the components of system 301 preferably runs on its own host machine 311-317. Host machines 311 and 313 are termed in the following database servers. The components are networked together by network 319. In system 301, the data backup and recovery aspects of the system, including fast start failover, are managed by a set of processes which are collectively termed Data Guard. One of the components of Data Guard is the Broker, which is a distributed management framework that automates the creation, maintenance, and monitoring of Data Guard configurations. Users can interact with the Broker either via the graphical user interface provided by the Oracle Enterprise Manager or a command line interface for Data Guard, termed herein DGMGRL. The Broker interacts with the primary database, the standby database, and the Observer by means of messages that are termed in the following Broker messages. These components can also interact with each other by means of Broker messages.

Each host 311 and 313 contains a primary database system 303 or standby database system 305. The components of the database system include System Global Area (SGA) 321 which is used to share data between processes. Among the processes belonging to an Oracle database are database processes 322, including processes devoted to carrying out the Data Guard functionality 323 of the Oracle database. These processes maintain a separate persistent store of configuration metadata 329. Metadata 329 stores a profile of the Data Guard configuration, that is, information as to which database system is primary, which database system is standby, whether or not automatic failover is enabled, the value of the FSFO Threshold, and other configuration data. A portion of this profile concerns Fast-Start Failover and is termed in the following the FSFO context.

Observer process 307 is a client of the primary and standby database systems. As such, observer process 307 may be embodied as a separately executable process on its host machine 315 or as a thread of execution, if that is more appropriate for its host machine. The only requirement is that the observer be an independently executing entity that is capable of connecting to host machines 311 and 313 hosting the primary and standby databases and of maintaining its own persistent store of FSFO state. Whether it is embodied as a process, a thread, or other separately executing entity, observer 307 will be referred to herein as the 'Observer process' or just 'Observer'. It is recommended that Observer process 307 be placed on a separate host 315 from other hosts 311, 313, and 317 in the configuration 301. Observer process 307 maintains a small amount of persistent storage 331, into which it records relevant information pertaining to the Data Guard configuration that it will be 'observing'.

The Observer

An Observer 307 has a unique identifier termed the OBID. The first time an Observer 307 is started, it obtains the OBID by registering itself with Data Guard. Once the Observer has its OBID, it executes a "GET_FSFO command that queries primary database server 303 for FSFO context information. Upon receipt of this command, primary database server 303 passes information from DG metadata 329 back to Observer 307. The information includes:

The unique identifier for the fast start failover configuration's current Observer; this should be the same as the OBID which the Observer received when it registered.

Whether or not FSFO is enabled at the moment.

Which database is the primary database system and how to reach it

If FSFO is enabled, then additionally

Which standby database 305 is the FSFO target standby database system and how to reach it The current value of the FSFO Threshold The Metadata Incarnation Value (MIV), which is a monotonically increasing number that is incremented for every change that is ever made to the DG metadata 329

Other FSFO related information

Observer 307 stores this information in its local "Observer Storage" file 331.

If FSFO has not been enabled, Observer 307 will periodically reattempt the gathering of FSFO information from primary database server 303 and will not actually be "observing" until it receives an indication from the primary database server 303 that FSFO has now been enabled.

Once these initial steps have occurred and FSFO has been enabled Observer 307 begins "observing". This consists of periodic pings to primary database server 303 and FSFO target standby server 305. Each ping consists of a message sent by Observer 307 to the database server that includes the following:

- The Observer ID that Observer 307 received from server 303 upon successful registration;
- the Observer's current MIV; and
- the Observer's current FSFO configuration state, including the current role, either primary or standby, of the server being pinged.

Observer Detects Need for Failover

There are two basic ways for Observer 307 to decide that a failover should be attempted. One is that Observer 309 determines from the primary's failure to respond to the Observer's ping that the primary is absent. If the ping that Observer 307 sends to the primary server does not receive a timely response, Observer 307 will retry the ping according to a retry algorithm that factors in the value of the FSFO Threshold. If no contact with the primary can be made before that threshold expires, Observer 307 assumes that primary database 303 has failed and begins the failover sequence.

Another is that primary server 303 informs Observer 309 that a failover is necessary. The function on the primary server 303 that responds to the Observer's ping will perform certain internal checks to determine if any conditions exist that would require a failover. In a preferred embodiment, one such condition is datafile corruption. In other embodiments, there may be other conditions that require a failover and in still others, an application program that is using the primary database system may specify that a failover should occur. The absence of primary database 303 and other conditions in primary database 303 which require a failover are termed in the following failover conditions. When Observer 307 determines that a failover condition has arisen, it immediately sends a message to standby database 305, which asks standby database 305 if it is "ready to failover". Standby database 305 evaluates the request and responds to Observer 307. It may respond "No" because, unlike Observer 307, it's possible that standby database 305 is actually being contacted by primary database 303 on a timely basis. This would be the case where network connectivity between primary 303 and Observer 307 is down, but is up between primary 303 and standby 305.

After evaluating the relevant conditions, standby 305 either rejects the request or acknowledges that it can do the failover. If standby 305 rejects the request, Observer 307 continually retries until either the conditions provoking the failover attempt get resolved, for example, connectivity between primary 303 and Observer 307 is restored, or until standby 305 eventually acknowledges that it can do the failover, in which case Observer 307 tells standby 305 to proceed with the failover.

Observer 307 records in its persistent storage 331 that a failover has begun. Observer 307 awaits status from standby 305 that the failover operation has indeed completed, i.e., standby 305 has now become primary 305, and that the Data Guard metadata 329 has been updated accordingly and the MIV incremented. At this point Observer 307 begins pinging the new primary 305 which, as described above, will respond to the Observer that the Observer no longer has a current MIV. Observer 307 then issues the "GET_FSFO" command to new primary server 305 to refresh its copy of the FSFO context information.

Recovering the Failed Primary

Following the failover, Observer 307 continually attempts to ping the old primary 303. Once connectivity is reestablished between old primary 303 and both Observer 307 and standby 305 (either by restarting a failed primary 303 after it crashes or by resolving the network outage that led to the failover), the old primary 303 learns from the role value in Observer 307's ping that the old primary is no longer the FSFO primary database and indicates to Observer 307 that it is ready to become the new FSFO target standby. Observer 307 and the new primary 303 then work together to reinstate the old primary 303 as the new FSFO target standby.

Figure 5:
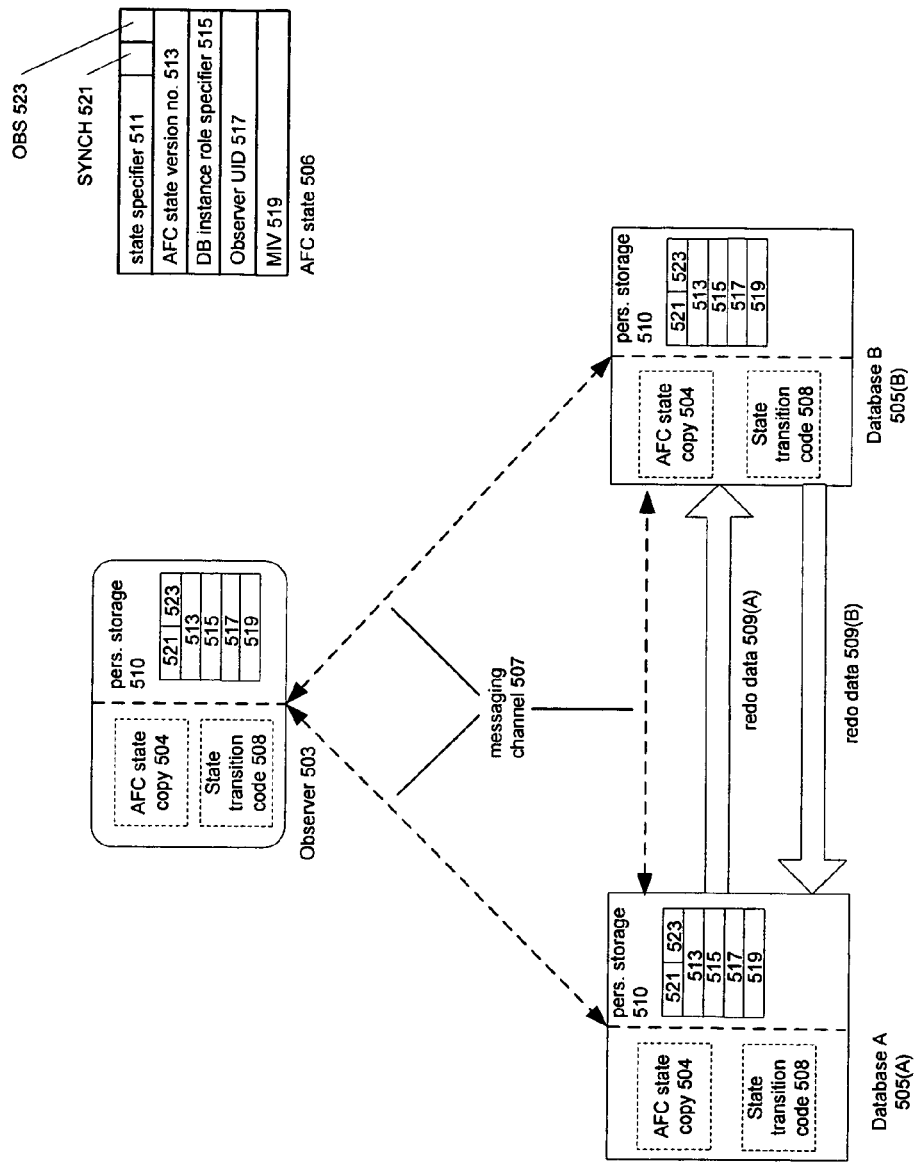
FIG. 5 is a functional block diagram of the automatic failover configuration of the invention.

Overview of an Automatic Failover Configuration: FIG. 5

In the following, a database system such as system 301 which is configured for automatic failover will be termed an automatic failover configuration or AFC. FIG. 5 is a conceptual block diagram of an AFC 501. Configuration 501 has three participants: Observer 503 and two databases 505(A) and 505(B). Either of these databases may function as a primary or standby database system; arrows 509(A) and (B) indicate the direction of flow of redo data when one of the databases is the primary and the other is the standby. Thus, arrow 509(A) shows the direction of flow of redo data when database 505(A) is the primary and database 505(B) is the standby. Either or both databases 505 may consist of a cluster of database instances. In the preferred embodiment, the cluster is an Oracle Real Application Cluster or RAC; however, such clustered database instances appear to configuration 501 as a single database.

Each participant has a copy 504 of AFC state 506, which contains the current AFC configuration state of AFC 501. The AFC configuration states are states of the entire configuration, as opposed to states of the participants in the configuration. Because each participant has its own copy 504 of AFC state 506, a given participant may at times have a copy which indicates a configuration state which is different from the actual current configuration state. As will be explained in detail below, a state propagation mechanism ensures that the actual current configuration state will be propagated to the copies in all of the participants.

Transitions to another AFC state are made by one participant, often with the aid of another participant, and then propagated to the other participants by the propagation mechanism. In system 301, a portion of the AFC configuration state is part of the FSFO context. The participants communicate with each other by messaging channel 507. The communications serve three purposes:

- determining whether a participant is present;
- indicating to a participant of configuration 501 that is involved in a state transition that another participant has made the transition and consequently, the first participant may make the transition; and
- propagating the current configuration state 506 of automatic failover configuration 501 to all participants.

Propagation occurs via regular messages from participants to other participants.

Overview of AFC State 506

In overview, AFC state 506 contains a state specifier 511 which specifies a configuration state of AFC 501, a state version number 513 which increases monotonically each time the configuration state of AFC 501 changes in a way that is of interest to all three participants, a role specifier 515 which specifies the current primary database in AFC configuration 501, an observer UID 517 which specifies the current observer 503, and the current MIV 519. As will be explained in more detail later, during a change of configuration state 506, the AFC participants who participate in making the state change write parts of the new state to persistent storage 510. They do this in an order which is termed in the following a careful ordering of writes. Writing a value to persistent storage 510 is termed in the following persisting the value.

Propagation of AFC State

AFC state 506 is propagated among the components of AFC 501 by messages containing copies of AFC state 506. The messages accompany pings. In the following, a participant which pings another participant is termed the pinger; the participant which is the recipient is termed the pingee. Propagation occurs generally as follows: Observer 503 periodically pings both databases 505; the current primary database 505(A) periodically pings the current standby database 505(B). When a change in AFC state 506 occurs which must be propagated to all participants in AFC 501, state version 513 is increased. When a pingee receives a ping from a pinger and the message accompanying the ping has a value in state version 513 which is different from the value of state version 513 in the pingee's copy, the pingee responds as follows:

- if the message from the pinger has a value in state version 513 which is less than the value of state version 513 in the pingee, the pingee responds by sending its copy of AFC state 506 to the pinger.
- if the message from the pinger has a value in state version 513 which is greater than the value of state version 513 in the pingee, the pingee stores the copy of AFC state from the message in its persistent storage 510 and returns the stored copy to the pinger.

The pinger and pingee then manage the propagation of the state together. The manner in which this is done will be explained in detail later.

As is apparent from the foregoing, the manner in which state is propagated to a participant in AFC 501 depends on which participants are currently present in the configuration and on the relationship between the time at which a component changes its AFC state and the times at which the pinging occurs. For example, one event which can cause a transition in AFC state 501 is the discovery by the standby that there are gaps in the redo data which it has received. When the standby discovers the gap, it makes the transition in its own copy of AFC state 506. The new state is then propagated by pings. Depending on the order of the pings, the Observer may then get the new state from the primary, the primary may get the new state from the Observer, or each may get the new state directly from the standby. If a participant is absent when a state transition occurs, the absent participant will receive the current state from one of the other participants when it returns.

Figure 4:
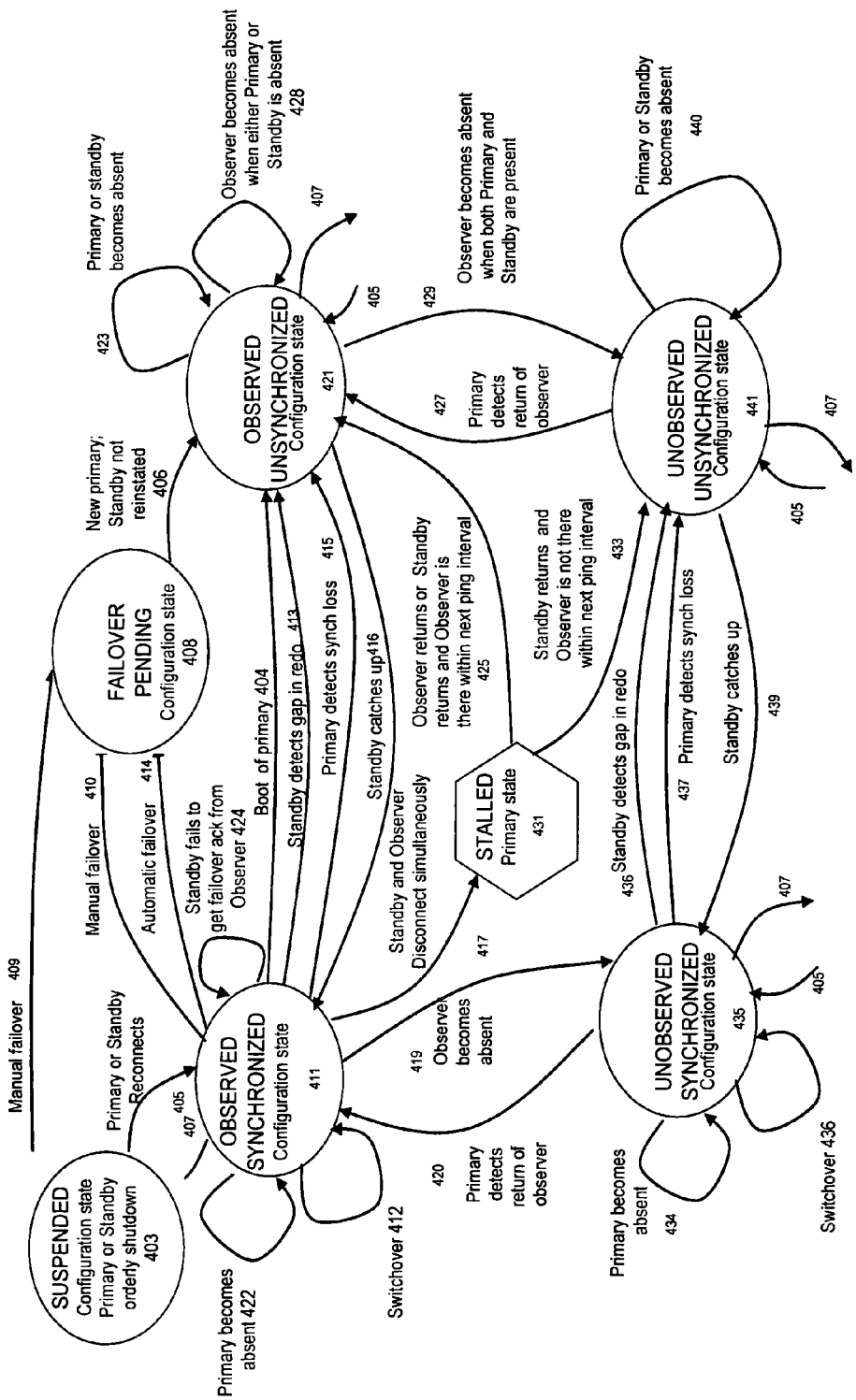
FIG. 4 shows the state machine for the automatic failover configuration of the invention.

State Machine for AFC 501: FIG. 4

The behavior of AFC 501 can be described in terms of a state machine that describes the possible AFC configuration states and how AFC 501 transitions from one AFC configuration state to another. FIG. 4 shows the state machine 401 for AFC 501.

The circles (configuration-wide states) and hexagons (per-node states) represent states of the state machine. The arcs between states represent the external events that trigger transitions between the states.

Components of AFC Configuration States

There are six AFC configuration states, indicated by circles in FIG. 4. Four of these states, 411, 421, 435, and 441, have two component states: an OBSERVED/UNOBSERVED state and a SYNCHRONIZED/UNSYNCHRONIZED state. These component states are defined as follows:

SYNCHRONIZED: When the standby is synchronized with the primary, the primary sends packets of redo data to the standby and receives a confirmation for each packet from the standby after the standby has written the packet to a redo log file in the standby. The primary further does not commit the transaction a packet of redo data belongs to until it has received confirmations for all of the packets of redo data belonging to the transaction. The fact that the configuration is SYNCHRONIZED means that the standby has a copy of all of the redo data produced by the primary and that the standby can therefore become the primary. Consequently an automatic failover can occur if the configuration is SYNCHRONIZED and the Observer is able to provide quorum for the automatic failover.

UNSYNCHRONIZED: When the primary is free to commit redo data without receiving confirmations from the standby database 505, the configuration is UNSYNCHRONIZED. Because the standby is guaranteed to have a complete copy of the redo data generated by the primary only in SYNCHRONIZED, the standby will not participate in an automatic failover when the AFC configuration state indicates UNSYNCHRONIZED.

OBSERVED: The configuration becomes OBSERVED when primary database 505 receives a ping from Observer 503 and remains OBSERVED until both databases 505 agree that neither is receiving pings from Observer 503. When configuration 501 is in the OBSERVED state, the configuration may not transition to a state which is UNSYNCHRONIZED unless another participant provides the primary with a quorum. The exception to this rule is automatic failover, during which the primary is absent.

UNOBSERVED: When both databases 505 agree that they are not receiving pings from Observer 503, the configuration becomes UNOBSERVED. It remains UNOBSERVED until primary database 505 detects the presence of Observer 503. When the configuration is UNOBSERVED, the configuration may transition to a state that includes UNSYNCHRONIZED without quorum being provided for the primary by another participant. Thus, the primary may transition the configuration to UNSYNCHRONIZED when the standby becomes absent, even though the absent standby leaves the primary without a quorum. The primary can thus continue to produce redo data in the absence of both the Observer and the standby. When the configuration is in a state which is UNOBSERVED, the primary is protected from divergence by the fact that the standby will not participate in a failover.

The definitions of states 411, 421, 435, and 441 flow directly from the above definitions of SYNCHRONIZED/UNSYNCHRONIZED and OBSERVED/UNOBSERVED.

OBSERVED and SYNCHRONIZED 411: The primary and the standby have not both detected that the Observer is absent. The primary is receiving a confirmation each time it sends a block of redo data to the standby. This is the steady state of a running AFC 501. It is also the only state from which an automatic failover may occur.

OBSERVED and UNSYNCHRONIZED 421: the primary database is committing redo data without receiving confirmations from the standby, but the primary and standby have not agreed that the Observer is absent. Configuration 501 may be unsynchronized because the standby may be absent, because the standby has returned but has not yet caught up with the primary in processing redo data, or because the standby may have found a gap in the redo data. The standby may be absent because the standby has either lost connectivity or has malfunctioned or because a failover has occurred. As a result of the failover, the former standby has become the primary, but as yet, no new standby has joined the configuration. The new standby may, of course, be a reinstated primary.

UNOBSERVED and SYNCHRONIZED 435: The primary is not receiving pings from the Observer but is receiving confirmation for each block of redo data it sends to the standby.

UNOBSERVED and UNSYNCHRONIZED 441: The primary is not receiving pings from the OBSERVER and is committing redo data without receiving confirmations from the standby. In this state, the primary can keep running even when both the standby and the Observer are absent.

SUSPENDED 403: The SUSPENDED state occurs when either the standby or the primary has been shut down in an orderly fashion. The standby will refuse any offer to failover from the Observer while in this state. The state is cleared upon re-establishing connectivity with the primary. SUSPENDED can be reached from any of configuration states 411, 421, 435, and 441. Because this is the case, the participants of AFC 501 may be shut down and brought back up in any order.

FAILOVER PENDING 408: This state occurs when a failover has either been initiated manually by a DBA or automatically as a consequence of the absence of the primary. In FAILOVER PENDING, the former standby becomes the new primary.

STALLED state 431 of the primary database occurs when AFC 501 was running in OBSERVED and SYNCHRONIZED state 411 and both the standby and Observer become simultaneously absent. In the present context, simultaneously means that the time interval between the one becoming absent and the other becoming absent is so short that the configuration cannot make the transition from OBSERVED SYNCHRONIZED 411 to UNOBSERVED SYNCHRONIZED 435 or to OBSERVED UNSYNCHRONIZED 421. Because AFC configuration 501 is unable to reach a state in which the primary can generate redo data without confirmation from the standby, the primary stalls. It should be noted, however, that in AFC 501, a stall of the primary can occur only when AFC 501 is in OBSERVED SYNCHRONIZED 411 and the standby and the Observer become absent simultaneously. Put another way, the primary can continue to produce redo in the absence of both the standby and the Observer as long as the Observer and the standby become absent sequentially, in any order.

Behavior of AFC 501 in States 411, 421, 435, and 441: FIG. 12

The above description of states 411, 421, 435, and 441 of AFC 501 is summarized from the point of view of the behavior of AFC 501 in a given state in table 1201 of FIG. 12. Table 1201 has four columns: column 1203, with the names of the states, column 1205, which indicates whether an automatic failover is permitted in the state, column 1207, which indicates whether the primary and standby are synchronized in the state, 1209, which indicates whether the primary will stall in the absence of the standby only in the state, and 1211, which indicates whether the primary will stall in the absence of both the standby and the Observer in the state. There is a row for each of the four states. Thus, the row for state OBSERVED SYNCHRONIZED 411 indicates that AFO is permitted in the state, that the primary and secondary are synchronized in the state, and that the primary does not stall in the state when the standby is absent and the Observer is present, but stalls in the state only if both the standby and the observer are simultaneously absent. As indicated in footnote 1, the primary does not stall in OBSERVED SYNCHRONIZED when the standby is absent and the Observer is present because the presence of the Observer guarantees that the standby will return to a system that is in the UNSYNCHRONIZED state and will consequently not participate in the failover. This in turn makes it possible for the primary to transition to OBSERVED UNSYNCHRONIZED instead of stalling when the standby becomes absent. The primary does not stall in UNOBSERVED SYNCHRONIZED when the standby becomes absent because the transition from OBSERVED SYNCHRONIZED to UNOBSERVED SYNCHRONIZED requires that both the primary and the standby have noted the absence of the Observer. As will be explained in more detail later, because the standby has noted the absence of the Observer, it will not participate in a failover, and consequently, no divergence can occur as a result of the continued operation of the primary in UNOBSERVED SYNCHRONIZED and UNOBSERVED UNSYNCHRONIZED.

State Transitions in AFC 501

As indicated above, the state transitions in FIG. 4 are indicated by arrows. The labels on the arrows indicate the conditions under which the state transition occurs. Thus, there are three ways in which a state transition directly from OBSERVED SYNCHRONIZED 411 to OBSERVED UNSYNCHRONIZED 421 can occur:

The primary has booted up, can't reach the standby, and makes a request to open a database (404);

The primary has detected that the standby has lost synchronization (most often because the standby has become absent) (415); and The standby detects a gap in the redo (413).

State diagram 401 also includes state transitions from a state to itself, indicated by arrows that loop back to the state. These transitions from a state to itself include switchover transitions 412 and 436 are possible in states that include SYNCHRONIZED (states 411 and 435). In this transition, the primary and standby simply exchange roles.

Loops 422 and 434 show that the primary can become absent in states 411 and 435. In state 411, this transition occurs when the absence occurs under conditions which do not permit a failover.

Loops 423 and 440 show that either the primary or standby or both can become absent in states that include UNSYNCHRONIZED (states 421 and 441);

Loop 428 shows that the Observer can become absent in state 421 when either the primary or standby is absent; and Loop 424 shows that when a DBA has requested a manual failover and the standby cannot get an acknowledgment for the failover from the Observer, the standby remains in state 411.

Properties of State Transitions

The state transitions that are of principal interest in the present context are the transitions between states 411, 421, 435, and 441. These state transitions have a number of properties that are relevant to the way in which they are done.

Quorum

All of the transitions between states 411, 421, 435, and 441 involve one or both database systems. A database system involved in a given transition may or may not require a quorum to make the transition. In the present context, a quorum is an agreement between a database system participant in AF configuration 501 and another participant in configuration 501 that a state transition may be made. A database system requires a quorum for the transition if a failure in AF configuration 501 during the transition could result in the database system diverging from the other database system. Divergence is possible whenever a transition may occur while a participant in configuration 501 is absent. While the participant is absent, the current AFC state 506 may not be propagated to it. Consequently, the requirement for a quorum ensures that a returning participant will not act on the basis of old AFC state 506, either in producing redo when it should not or providing wrong responses to quorum requests.

For example, if the primary becomes absent, an automatic failover occurs, the standby becomes the new primary, and the former primary returns without receiving AFC state that indicates that the former primary is no longer the primary, the new primary and the former primary can produce divergent streams of redo data. In terms of state diagram 401, divergence has occurred if role specifier 515 in more than one of the participating database systems indicates that the participating database system is a primary database system and state specifier 411 for the participating database systems that are primary database systems indicates that those database systems are in a configuration state which includes UNSYNCHRONIZED (states 421 and 441).

Examples of transitions for which the primary database system requires a quorum are transition 415 and 419. In transition 415, the primary has detected that the standby has lost synchronization, generally because it has become absent. In these circumstances, the configuration should transition to OBSERVED UNSYNCHRONIZED. However, if the standby has become absent because a failover is occurring that the primary is unaware of, the configuration could again end up in an UNSYNCHRONIZED state in which there were two primaries. System 501 prevents this from happening by first requiring that the Observer be aware that a failover is going on and second by requiring that the standby which is becoming the primary receive quorum from the Observer for the failover. As will be explained in more detail later, if the Observer is aware that a failover is going on, it will not provide quorum for transition 415, and if the Observer is absent, it cannot provide quorum for transition 415. The primary will consequently make transition 415 only if the Observer is present and no failover is taking place. If the Observer becomes absent simultaneously with the standby, transition 415 becomes transition 417 and the primary stalls until the Observer and the standby provide quorum to make transition 425 or the standby provides quorum to make transition 433.

To ensure that a participant which provides quorum for another participant itself has the right values in its AFC state 506, system 501 employs carefully ordered writes. In transition 415, the carefully ordered write requires that the primary persist UNSYNCHRONIZED in its persistent copy 510 of state 506 after another participant has done so. Carefully ordered writes will be explained in detail later.

As regards transition 419, this transition occurs when the primary and standby are both present (as required by OBSERVED SYNCHRONIZED) and the Observer becomes absent. Because the transition is to a state (435) from which a further transition (437) to a state (441) that includes UNSYNCHRONIZED is possible without the presence of another participant to provide a quorum, the standby must provide quorum for the transition to UNOBSERVED SYNCHRONIZED. In the carefully ordered write, the primary persists the new state after the standby has persisted it. When the standby is in a configuration state (435, 441) including UNOBSERVED, it will not respond affirmatively to an attempted automatic or manual failover. Consequently, when transition 437 occurs and the standby returns in state 441, it cannot return as a primary database system and the two database systems cannot diverge.

Initiating a Transition

All of the transitions but automatic failover transition 414 are initiated by one or the other of the database systems. Transition 414 is initiated by the Observer. The database system which is the initiator of the transition is the first database system which determines that the transition should be made. For example, in both transition 415 and transition 419, the primary database system is the initiator.

Careful Ordering of Writes

Because the copies of AFC state 506 are distributed among the participants in AFC system 501, the information needed to prevent divergence must be persisted among the participants in AFC system 501 in a fashion such that a returning participant acquires the current AFC state 506. That is achieved by means of carefully ordered writes. In general, the careful ordering of writes requires that the new state resulting from a transition be persisted in the database system 505 for which the transition may result in divergence after it has been persisted in at least one other of the present participants. This ensures that if the potentially diverging database system 505 becomes absent before it persists the new configuration state, it will receive a configuration state from another participant when it returns and that configuration state will replace the configuration state that the potentially diverging database system had when it failed.

Acknowledgments

If the initiating database system requires a quorum to make a change, the initiating database system must persist the new state last. To deal with this problem, the initiating database system proposes the transition to the participant of AFC 501 providing the quorum. The quorum provider persists the required state for the transition and acknowledges to the initiating database system that it has done so; in response to the acknowledgment, the proposing database system persists the required state for the transition. Transition 419 requires such an acknowledgment. As will be explained in more detail below, in transition 419, the primary initiates the change to UNOBSERVED SYNCHRONIZED by sending the standby a ping that indicates the primary's intent to make the change to the standby. When the standby receives the ping, it determines whether it is still receiving pings from the Observer. If it is not, the standby persists UNOBSERVED and sends an acknowledgment that the Observer is absent in its response to the ping from the primary. When the primary receives the acknowledgment, it persists UNOBSERVED.

Continued Operability of AFC 501 During Absence and Return of Participants

An advantage of the manner in which AFC configuration state is propagated among the participants of AFC 501 and of the manner in which the configuration state is persisted in the participants is that a participant may leave AFC 501 and return to it without disrupting the operation of AFC 501. The AFC configuration state persisted in the returning participant indicates the configuration of AFC 501 when the participant left and the AFC configuration state that is propagated to the returning participant indicates the current configuration, and the existence of both the persisted state and the current state permits the returning participant to set its own AFC configuration state as required. A simple example is the following: the standby becomes absent when the AFC configuration state is OBSERVED SYNCHRONIZED, with AFC state version 513 having a value of x. The standby has persisted that state. When the standby returns, the current AFC configuration state is OBSERVED UNSYNCHRONIZED, with AFC state version 513 having a value that is greater than x. When a ping from the primary propagates the current AFC configuration state to the standby, the standby will respond to the new value of AFC state version 513 by persisting OBSERVED UNSYNCHRONIZED and the current AFC state version and return the values it has just persisted as its response to the ping.

Details of AFC State 506: FIG. 6

FIG. 6 shows details of an implementation 601 of AFC state 506 in a preferred embodiment. Where a component of FIG. 6 implements a component of AFC state 506 as shown in FIG. 5, the reference number for the component of FIG. 5 is shown in parentheses. In the preferred embodiment of system 301, in which automatic failover has been implemented in a preexisting system, the components of AFC state 506 may be persisted in a number of different entities in system 301:

the configuration file for the Observer;
the control files for the primary and secondary databases; and
the Data Guard metadata files for the primary and secondary databases.

In overview, AFC state 506 includes an AFC state version number 621 and set of flags 601 which specify the configuration states of FIG. 4. Other values indicate the last ping times (623 and 625), the threshold time period for an automatic failover (629), the current role of the participant (631), the identity of the current observer (627), and the current Metadata Incarnation Value (MIV) 634 for the Data Guard metadata. The portion of AFC state 506 which is propagated to the database system participants is flags 603, 605, 607, 609, 615, and 619; AFC state version number 621; Observer ID 627; role 631; AFO threshold 629; and MIV 634. Flags 607, 609, 619 are not propagated to the Observer. The methods used for propagation include pings for the flags and state version value 621, the GET FSFO function to propagate the OBID, role, threshold and MIV to the Observer and metadata resync messages from the Broker to propagate these items to the standby. In the following, this portion will be termed propagated AFC state. The portion of AFC state 601 which is persisted on careful writes is shown at 637.

Continuing in More Detail with the Flags,

AFO enabled flag 603 is set if automatic failover is enabled for the configuration.

Synchronized flag 605 and unobserved flag 607 together indicate which of the four states 411, 421, 435, and 441 this version of AFC state 506 is in. The mapping to the states is straightforward and is shown in table 635. A standby whose synchronized flag 605 is set to UNSYNCH or whose unobserved flag 607 to UNOBSERVED will not participate in a failover. When the Observer's synchronized flag 605 is set to UNSYNCH, the Observer will not respond to a failover condition raised by the primary.

Suspended flag 609 indicates whether the standby is in the suspended state shown at 403. It is persisted in the standby only. When the flag is set, the standby will not enter FAILOVER PENDING state 408 via automatic failover transition 414.

FO pending flag 615 indicates whether the configuration is in FAILOVER PENDING state 408. It is used to ensure that no split brain syndrome results from a failover.

Reinstate pending flag 619 indicates that a primary database system whose unavailability had resulted in a failover has returned and is about to be or is being reinstated as a standby database system for the new primary. When the returned database system gets the current AFC state 506 from another participant and sees that the other participant has a higher version and says that the returned database system's role is now "standby", it sets reinstate pending flag 619, and waits for further reinstate instructions from the Observer. When the reinstate operation is complete (which involves restarting database systems, flashback, control file conversion, etc) and the old primary is now a viable standby for the new primary, the new standby clears the reinstate pending flag.

Failover acknowledgment flag 639 is set by the standby when it has received a manual failover command.

Continuing with the other components of state 506 in a preferred embodiment, AFC state version 621 is a version number which is increased each time a transition from a state that includes SYNCHRONIZED to a state that includes UNSYNCHRONIZED or vice-versa is completed.

Portions of AFC state 506 vary from participant to participant. P-S timestamp 623 is a timestamp indicating when the standby database system last received data from the primary database system, either as a ping or as part of the generation and consumption of redo data. Observer time stamp 625 is a timestamp in each of the database systems which indicates when the database system last received a ping from the Observer.

Observer ID 627 is a unique identifier for the current observer 503. Its purpose is to prevent an Observer which is not the current observer from believing it is the current Observer and thus providing false information concerning the current state of system 501 to a database system participant seeking quorum. When the non-current Observer receives propagated state from another participant, the non-current Observer reads the observer ID 627 in the propagated state. If it is different from the observer ID 627 in its local state, the non-current Observer terminates itself.

Database system role 631 is available to and persistently stored in all participants. The primary gets its role from its control file. The Observer picks up the primary's role from the primary via a GET_FSFO which the Observer executes when the primary indicates in its response to an Observer ping that the Observer does not have the current value of MIV 634 and the standby picks it up from the control file or from the current primary as part of the reinstatement process. The former primary learns after failover that it is no longer the primary from Observer pings that indicate that the Observer believes the former primary to be the standby. When the Observer issues a reinstate command to the new primary to begin reinstating the standby, the reinstate command provides some of the new AFC state 601 for the new standby and the remainder is picked up via pings.

AFO threshold 629 is a parameter that governs how long the Observer and the standby will wait to hear from the primary before initiating automatic failover. In the Observer, it indicates the length of time pings to the primary may go unanswered before the Observer sends a ready to failover? message to the standby. In the standby, it indicates the length of time that the standby must have received neither redo data nor a ping from the primary in order to reply positively to the ready to failover? message.

Observer threshold 633 is a parameter for the length of time a ping from the Observer may be lacking in the primary before the primary proposes a change to UNOBSERVED to the standby (transitions 419, 429). In some embodiments, the parameter is fixed; in others, it may be settable by the DBA.

The standby will acknowledge the proposed change to UNOBSERVED only if it has not seen the observer for the same interval.

Details of the Messages used in a Preferred Embodiment of AFC 501: FIG. 7

Messaging Channel 507

In a preferred embodiment, messaging channel 507 is independent of redo data channel 509 and may use any data communications protocol to which the participants can properly respond. A consequence of the fact that messaging channel 507 is independent of redo data channel 509 is that Observer process 503 need not run in a system that hosts a database, but may run in any system which can communicate with the primary and standby database systems.

Messaging channel 507 uses two standard facilities in the participants belonging to AFC 501 to pass AFC state information among the participants in system 501: a pinging facility and a remote procedure call facility. The pinging facility permits a first participant to ping a second one and the second participant to respond to the ping. In the preferred embodiment, each ping contains the AFC state version value 621 for the sending participant's AFC state 506; the receiving participant compares that value with the AFC state version value 621 in the receiving participant's AFC, state 506, and if the version value in the receiving participant's AFC state 506 is greater, the receiving participant does not accept the incoming state, but includes a copy of its AFC state 506, including its AFC state version value 621, in the response to the sending participant, which then persists it. When the AFC state version value 621 in the receiving participant's AFC state is less, the receiving participant persists the incoming state AFC state and version number. The response to a ping thus not only indicates to the sending participant that the receiving participant is still available, but is also the mechanism by which AFC participants propagate and receive the current state of AFC 501 and is further part of the mechanism by which quorum is provided for state transitions.

The remote procedure call works in the usual fashion: one participant calls a procedure that will be executed in another participant. The invocation results in a message from the one participant to the other that contains an identifier for the procedure and the arguments needed to execute it. The other participant executes the procedure and returns a message to the one participant that contains the results of the execution.

Messages 703

FIG. 7 shows the messages 703 exchanged between Observer 503 and the database systems 505 in AFC 501 and the messages 731 exchanged between the primary and standby database systems 505. These messages are the means by which the participants in a state transition cooperate to accomplish the transition. If an acknowledgement is necessary for the transition, it is provided via a message, and the information needed for the carefully ordered writes is transferred via the messages. Finally, when a state transition has occurred, the messages propagate the new state to all of the participants in AFC 501. As previously explained, the messages use a standard pinging interface. Within that interface, the messages work like remote procedure calls: the message is the call and the response is the data returned by the call.

The current Observer 503 pings each of the available database systems 505 every three seconds. The message is shown at 705; it includes the OBID 707 for the current Observer, the state version number 709 in the Observer's copy 704 of AFC state 506, the AFO flags 711 from that copy, and the Observer's current MIV value 713. Also included in the Observer's AFO flags 711 is a flag which indicates whether the recipient database system is a primary or a standby. Reply 715 from a database system 505 includes the state version number 717 in the recipient's copy 704 of AFC state 506, the AFO flags 719 from that copy, and status values for the recipient.

What is in the recipient's copy when the reply is sent depends of course on the result of the comparison between the AFC state version number 621 in message 705 and the AFC state version number persisted in the recipient. The status values are the mechanism which the recipient uses to reply to the contents of the ping. For example, when the recipient does not acknowledge a proposed state transition, the status values indicate that fact to the initiator of the state transition. As shown at 723, the ready to failover? Message 723 has the form of a standard Observer ping message; the reply 725 is, however, simply status value727. The begin failover message is simply another Observer message 705.

With the database system messages, the message 733 from the primary and the reply 745 from the standby have the same components, namely AFO flags, AFC state version values 621, OBID 739 for the observer, a recipient role specifier 741, and flags 743. OBID 739 is not used in the present context. In message 733, AFO flags 735 are the sender's AFO flags, the version number 737 is the sender's version number, and presumed recipient role 741 is the role that the sender presumes the recipient has. In the response, the values in fields 747, 749, and 751 are provided by the recipient. Field 753 has a NULL value.

State change ack message 729 is the message that the Observer sends when it has received a message from the primary proposing transition 415 or 425, has accepted the transition, and has persisted the state change. The message contains the persisted state change. In response to message 729, the primary persists the state change, as required by the careful ordering of writes. The Observer also sends state change ACK message 729 to the standby when the standby is executing a manual failover.

Summary of the Properties of the State Transitions: FIG. 9

FIG. 9 is a table 901 which has a row for each transition between the configuration states of FIG. 4. A transition's row in the table contains the following information:

- A short description of the transition, at 902.
- The reference number for the transition in FIG. 4, at 903.
- The values in AFC state 506 which are changed as a result of the transition, at 905.
- the database system which initiates the transaction, at 907.
- Which of the participants, if any, requires a quorum to persist its copy of the values that are changed in AFC state 506, at 909.
- The participant in AFC 501 which is the source of any required quorum, at 911.
- Whether the initiator requires an acknowledgement in the transition, at 913.
- The participant in AFC 501 which is the source of any required acknowledgment, at 914.
- The careful order of writes for the transition and how the information for the writes is propagated, at 915.

In columns 911 and 914, the term "others" indicates that the quorum or acknowledgment source may be either of the other participants. For example, in transition 415, once the primary has initiated the transition and the Observer has persisted the SYNCH->UNSYNCH change and increased AFC state version value 621, the primary will generally receive a state change ack message 729 from the Observer and will then persist the new state resulting from the transition. However, the primary may also receive the ACK for the proposed state change from the standby and the standby may also receive the updated state from either the Observer or the primary. The transition typically occurs because S is absent but the ACK can come from either O or S since S can return and reply to a ping before O does. In column 915, the term "others" indicates that the other participants may be written in any order.

Transition 415 used as an example above may serve as an illustration of how table 901 is to be read. Transition 415 occurs when AFC 501 is in state OBSERVED SYNCHRONIZED 411 and the primary ceases to receive acknowledgments for redo data sent to the standby. The result of the state change is that synchronized bit 605 takes on the value UNSYNCHRONIZED and AFC state version value 621 is increased. When the primary ceases to receive acknowledgments, the primary stalls and initiates the state change by indicating in its reply to the next ping from the Observer that it wants to set SYNCHRONIZED bit 605 to UNSYNCHRONIZED. In response to the reply, the Observer persists the change of SYNCHRONIZED bit 605 to UNSYNCHRONIZED, increases and persists AFC state version value 621, and sends a state change ack message 729. In response to ack message 729, the primary persists UNSYNCHRONIZED and the state version number for the new state and resumes producing redo.

Details of the State Transitions

Figure 8:
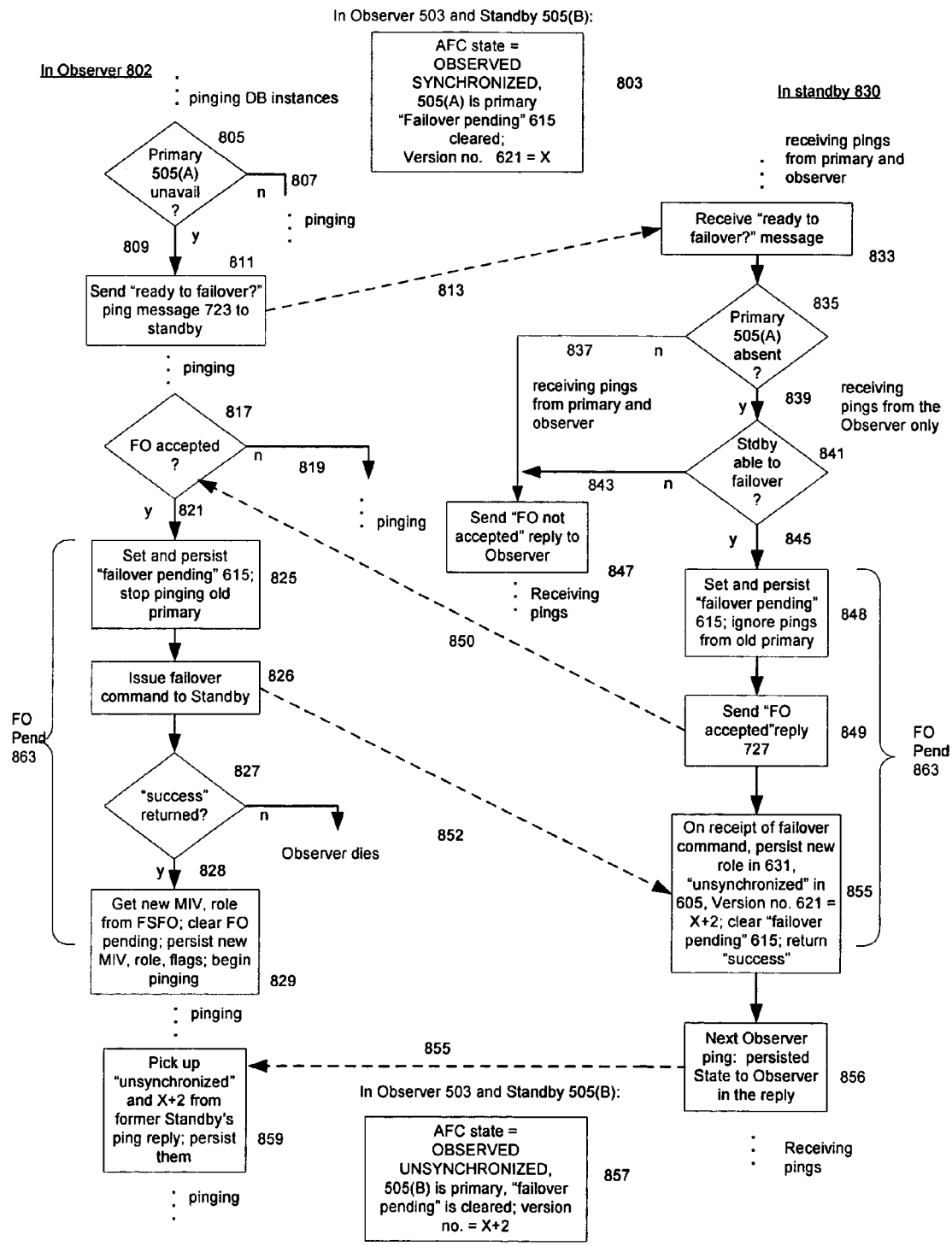
FIG. 8 shows a flowchart of automatic failover in a preferred embodiment.

Automatic Failover 414: FIG. 8

Automatic failover transition 414 occurs when the primary database system has become absent, either because the primary database system is not responding to observer pings or because the primary database system has determined that it cannot continue as the primary and has so indicated in response to a ping from the Observer.

Automatic failover includes a role change which must be managed to ensure that divergence does not arise. There are two aspects to managing the role change: one is to ensure that only one database can function as the primary database at a time; the other is to ensure that there is no propagation of state changes in the former primary to the other participants during the failover. To ensure that only one database can function as the primary database at a time, a standby whose AFC state 601 indicates that it is in a state that includes UNSYNCHRONIZED, UNOBSERVED, or SUSPENDED will not respond to a proposal to carry out an automatic failover. To ensure that no state changes are propagated from the former primary during the failover, FO pending bit 615 is set first in the former standby and then in the Observer. As long as FO pending bit 615 is set in the former standby, the former standby will respond to a failover request from the Observer but will not respond to pings from the old primary; as long as FO pending bit 615 is set in the Observer, the Observer will not ping the old primary. Thus, state changes cannot be propagated from the former primary. Moreover, when FO pending bit 615 is set in the former standby, the standby will not transition to SUSPENDED.

FIG. 8 provides a detailed illustration 801 of state transition 414 with automatic failover. The figure contains two flowcharts, flowchart 802, which shows the behavior of Observer 503 after it observes that primary 505(A) is absent, and flowchart 830, which shows the behavior of standby 505(B) after the standby has received a "ready to failover?" message from Observer 503. Messages sent between the Observer and the primary are represented by dashed arrows.

At the beginning of transition 414, AFC 501 is in OBSERVED SYNCHRONIZED state 411, as indicated at 803, and copies 504 of AFC state 506 in the Observer and the standby indicate that fact. Flags 605 and 607 are set accordingly and flag 615 is not set. Observer 503 is pinging the database systems. As indicated by decision block 805, if a ping indicates that the primary is present, Observer 503 keeps on pinging (branch 807); otherwise, branch 809 is taken after the number of seconds specified in AFO threshold 629 or after the Observer receives a request for failover from the primary. In this branch, Observer 503 begins sending a "ready to failover?" ping message 613 (811) to the standby, as shown by dashed arrow 813. Observer 503 then continues every three seconds to try to connect to the primary while waiting for reply 725 from the standby (817). If the Observer does successfully connect to a now returned primary and successfully pings it before the standby responds positively to the request to failover, the Observer will stop sending the "ready to failover?" ping message and will not issue a failover command even if S responds positively to a previously sent request.

Continuing in flowchart 830, the standby receives the "ready to failover?" message 813 at 833. Then it checks at 835 if it has heard from the primary within AFO threshold seconds either via a ping or via receipt of redo data from the primary; if not, or if the primary's ping indicated that the primary was requesting failover, the primary is absent; if the primary is absent, the standby checks whether the failover is otherwise possible (841). If the primary is available or the failover is otherwise impossible (branches 837 and 843), the standby sends a "failover not accepted" reply to the Observer's ping (847). Conditions under which the standby will not agree to a failover include mismatches between the standby's Observer ID 626 or MIV 634 value and the ones in the "ready to failover?" message, synchronized bit 605 set to UNSYNCH, a mismatch between the standby's AFC state version value 621 and the AFC state version value 621 in the message, the standby having Unobserved 607 set to UNOBS, or the standby having the suspend bit set.

If the standby can agree to the failover, it prepares for failover by setting and persisting its copy of FO pending flag 615 (848) and sending a "failover accepted" reply 850 to the Observer's ping (849). While FO pending flag 615 is set in the standby, the standby ignores pings from the former primary. In response to the "failover accepted" reply, the Observer sets and persists its copy of FO pending flag 615 (825) and stops pinging the former primary. Once both the Observer and the standby have both persisted FO pending flag 615, system 501 is in FAILOVER PENDING state 408, as shown by brackets 863

Next, the Observer issues a failover command (852) to the standby and waits for the return result from the command (826). In a preferred embodiment, the failover command takes the form of a Data Guard Broker failover command. When the standby receives the command (852), it carries out the actions necessary to make itself into the new primary and when it is finished, returns a "success" return result to the Observer. As shown at 855, the actions include persisting the standby's new role in 631, persisting UNSYNCHRONIZED in 605, increasing AFC state version value 621 by 2 and persisting the new value, and clearing persisted FO pending flag 615. MIV 634 is also increased. With FO pending flag 615 cleared, the new primary begins responding again to pings from the Observer.

When the standby returns "success" (827), the Observer does a GET_FSFO to get the new MIV and the identification for the new primary from the new primary's FSFO context, clears the FO pending bit, and persists these changes (829). It then begins pinging the new primary and the new standby. Then the new primary responds to the ping by passing UNSYNCHRONIZED and AFC state version number 621 X+2 to the Observer (856), which persists these values (859), leaving AFC 501 in the state indicated at 857. The new primary then begins pinging the standby. When the new standby wishes to be reinstated in system 501 so that it can begin receiving redo, the new standby sets REINST_PENDING bit 619 in its AFC state and provides the new setting to the Observer in a response to a ping. The Observer then issues a reinstatement command to the new primary, which begins the process of recovering the new standby to the point where it can begin receiving redo.

Manual Failover 409 and 410

Manual failover 409 and 410 begin with a failover command which the DBA issues via either the EM GUI or the Broker's command line interface to the current standby. When the standby begins executing the command, it sets FO Ack pending bit 639 in its AFC state 601 and responds to the next ping from the Observer by sending a reply indicating the FO_ACK_REQ status. FO_ACK_REQ indicates to the Observer that the standby has received a command to do a failover. The Observer persists FO pending bit 615 and sends the standby a state change Ack message 729. When the standby receives message 729, it knows that the Observer has persisted FO pending bit 615, persists its own copy of the bit, and proceeds substantially as set forth in 855 of FIG. 8. If the standby has not received state change Ack message 729 within a predetermined period of time (90 seconds in a preferred embodiment), it returns to the state it was in when it received the command from the DBA, as shown by loop 416 in FIG. 4. After sending state change Ack message 729, the Observer stops pinging the old primary and commences pinging the standby. The replies to the pings eventually return a MIV_MISMATCH status which tells the Observer that its MIV 519 does not match the standby's MIV 519. The mismatch indicates that the failover has completed, so the Observer responds by clearing FO pending bit 615 and getting a new FSFO context which includes the new MIV 519 and an identifier for the new primary database from the new primary and the new primary's returns to the Observer's pings eventually include UNSYNCH and X+2 as the value of AFC state version value 621, which the Observer then persists.

Details of State Transition 404

When a primary boots up, it copies its persisted AFC configuration state into its memory; the current AFC configuration state is then propagated from the other participants in the usual fashion. If the persisted state is any AFC configuration state other than OBSERVED SYNCHRONIZED, the primary can immediately begin processing redo. If the persisted state is OBSERVED SYNCHRONIZED and the primary is not connected to the standby, the primary transitions to OBSERVED UNSYNCHRONIZED 421 prior to opening the database. The transition is necessary because opening the database produces redo data. That would in turn result in a stall of the primary if the primary were still in OBSERVED SYNCHRONIZED 411. As in the other transitions of system 501 from OBSERVED SYNCHRONIZED to OBSERVED UNSYNCHRONIZED, the primary must have a quorum from one of the other participants. As in transition 415, the primary indicates in its response to a ping from the Observer that it wishes to make a transition to UNSYNCH; the Observer persists the new setting of Synchronized bit 605 and the new value of AFC state version value 621 and sends state change Ack message 729. The primary receives Ack message 729 either from the Observer or the standby, and when the primary receives the message, it persists the new setting of Synchronized bit 604 and the new value of AFC state version 621; having done so, it opens the database.

Details of State Transitions 419 and 429

These transitions occur when the Observer becomes absent and both the primary and the standby database systems are present and can thus confirm the absence of the Observer. As set forth in table 901, the transitions are initiated by the primary, the primary and the standby provide quorums for each other, and the standby provides an acknowledgment for the primary. The order of writes is standby, primary.

Figure 11:
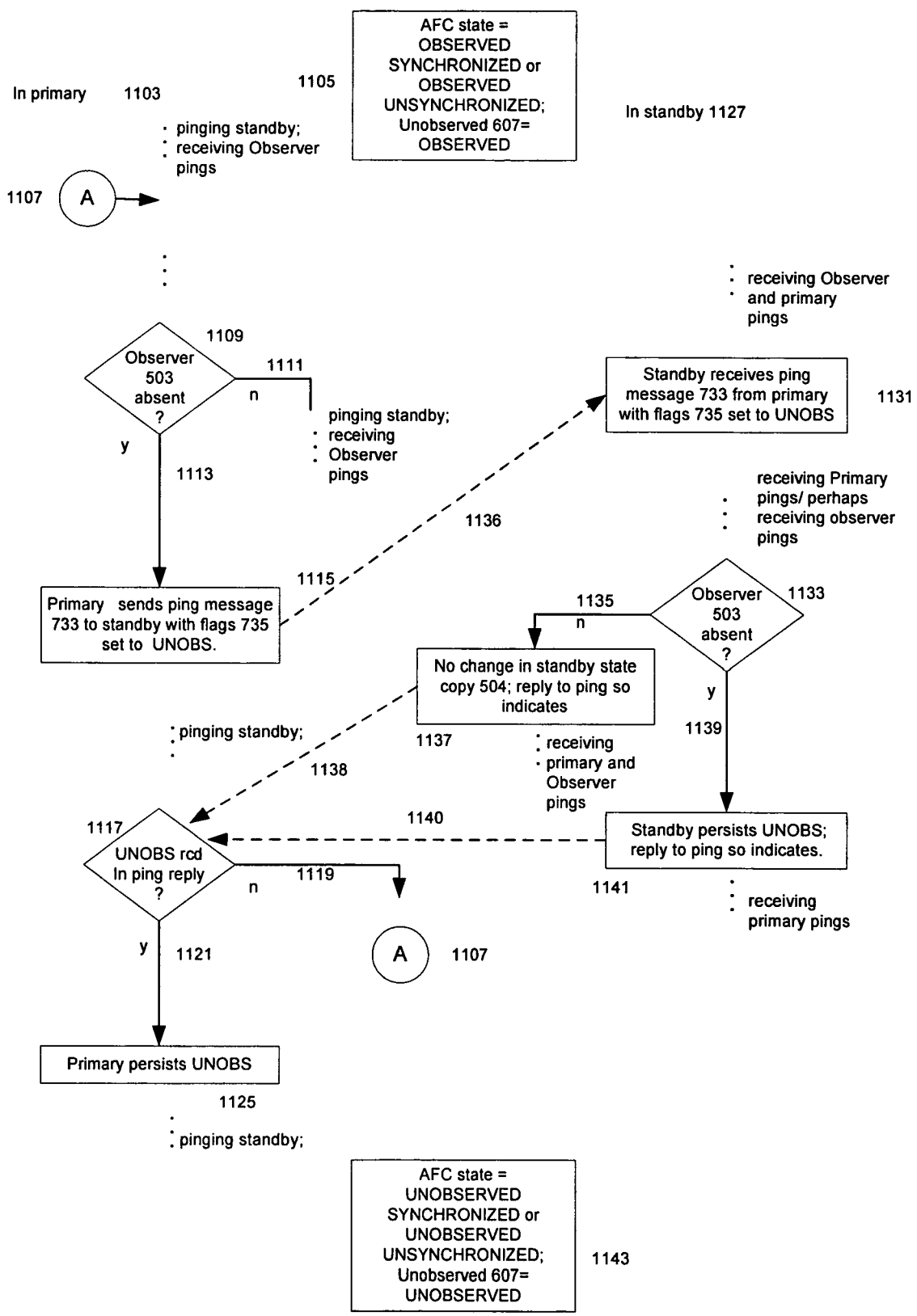
FIG. 11 shows a transition in which the Observer becomes absent.

FIG. 11 provides a flowchart for these transitions at 1101. As before, the state of AFC 501 at the beginning of the transition is shown at the top, at 1105, and the state of AFC 501 at the end of the transition is shown at the bottom at 1143. The flowchart for the primary database system is at 1103; the one for the standby is at 1127; messages passing between the primary and the standby during the transition are shown with dashed lines.

At the beginning of the transition, the primary is pinging the standby and receiving Observer pings. As shown by decision box 1109, as long as the Observer keeps pinging the primary, the primary keeps on receiving and providing pings; if an Observer ping does not arrive within the period specified by Observer threshold 633, the primary indicates in its next ping to the standby that it intends to set Unobserved 607 to UNOBS (1115). The ping is shown at 1136. The standby receives the ping at 1131. If the standby also hasn't heard from the Observer for the same threshold (1133), it leaves UNOBSERVED set in the values returned to the primary in response to the ping (1140) and persists the change in its own copy of state 601 (1141); If it has heard from the observer, it returns its unchanged copy of state 601 to the primary (1137, message 1138) and the primary remains in the OBSERVED state. Message 1140 provides the acknowledgment which the primary requires for the state transition, so upon its receipt, the primary persists the change to UNOBSERVED (1125).

In transition 419 or 429, the primary provides the quorum that the standby needs to make the change via ping to 1138 to the standby. The new state propagated by the ping indicates to the standby that it has quorum to make the change. Ping reply 1140 from the standby to the primary provides the acknowledgment that the primary requires to persist the change. The order of writes is standby, primary.

Details of State Transitions 420 and 427

Figure 10:
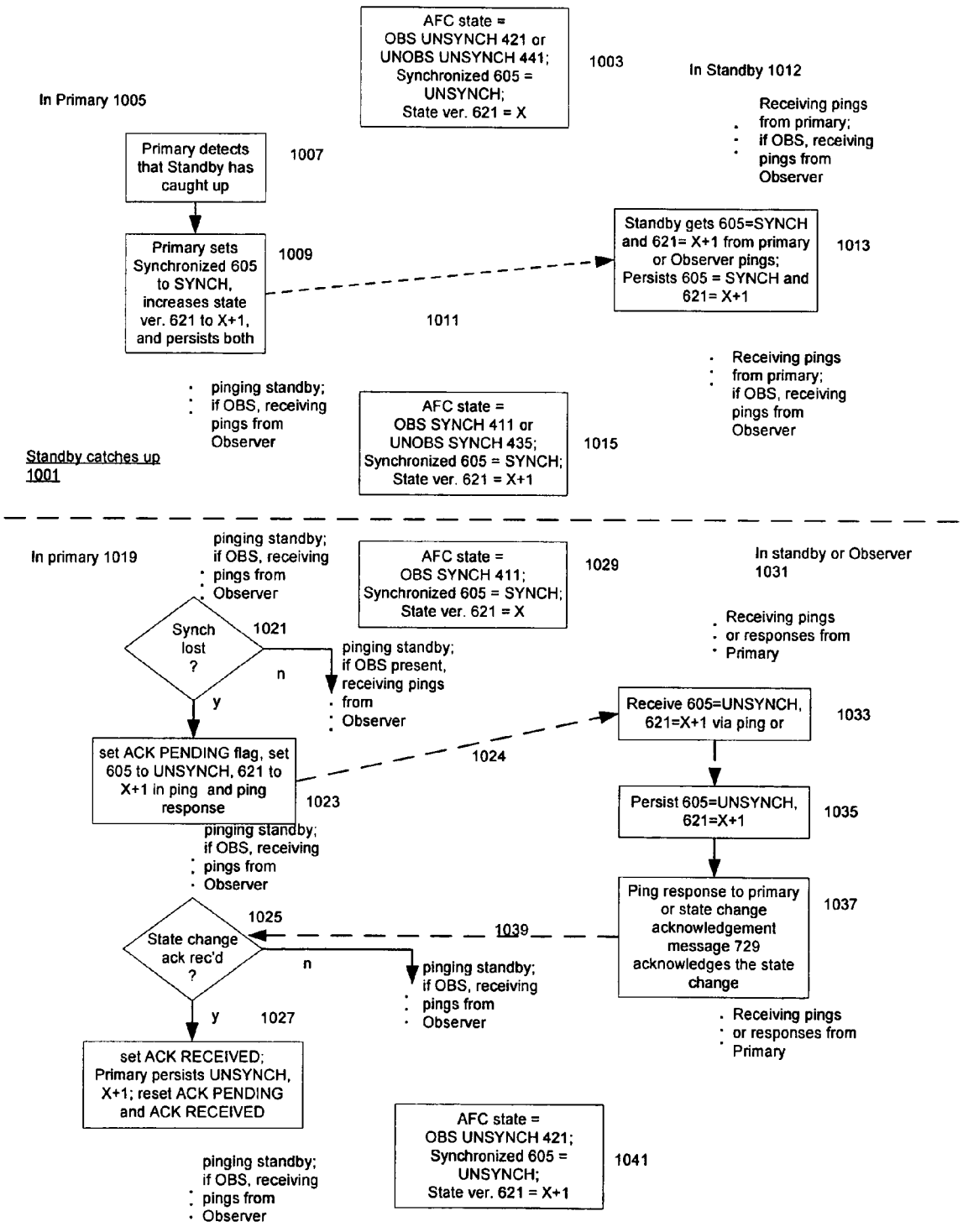
FIG. 10 shows transitions in which the standby becomes unsynchronized and returns to synchronization.

These transitions from UNOBSERVED SYNCHRONIZED 425 to OBSERVED SYNCHRONIZED 411 or from UNOBSERVED UNSYNCHRONIZED 441 to OBSERVED UNSYNCHRONIZED 421 occur when the Observer returns. In the transition, the value of unobserved bit 607 becomes OBSERVED. The transition is initiated by the primary. The standby requires quorum for the transition, and the quorum is provided by the primary, When the primary begins receiving pings from the returned Observer, it persists unobserved bit 607 as OBSERVED and propagates the new state to the standby via pings. The standby simply persists OBSERVED as well upon receipt of the ping from the primary Details of State Transition 415: FIG. 10

State transition 415 from OBSERVED SYNCHRONIZED 411 to OBSERVED UNSYNCHRONIZED 421 occurs when the primary ceases receiving confirmations for the redo data it sends to the standby, generally because the standby has become absent. The transition is shown in detail at 1017 in FIG. 10. The starting state is shown at 1029: it is OBS SYNCH 411; synchronized 605 has the value SYNCH and AFC state version 621 has a current value X; the ending state is shown at 1041: it is OBS UNSYNCH 421; synchronized 605 has the value UNSYNCH, and AFC state version 621 has been increased to X+1. As indicated in FIG. 9, the transition is initiated by the primary and the quorum is usually provided by the Observer, but may also be provided by the standby in situations where the Observer is also absent and the standby returns before the Observer does. In the following, where either the Observer or the standby is involved, the term partner will be used.

An acknowledgment is required and comes from the partner. The flowchart for the primary is at 1019; the flowchart for the partner is at 1031. In flowchart 1019, the primary is pinging the standby and is being pinged by the Observer; at 1021 the primary fails to receive a confirmation from the standby that the last redo data sent to the standby has been written and concludes from that that the standby has lost synchronization. The primary responds to this condition by setting synchronized bit 605 to UNSYNCH, setting AFC state version 621 to X+1, and setting the ACK_PENDING flag and then waiting for the delivery of an ACK from a partner.

One or both of the partners receive the response or ping indicating that the primary wishes to set synchronized 605 to UNSYNCH and AFC state version 621 to X+1, as shown at 1033. Either responds by persisting the setting of synchronized 605 to UNSYNCH and the setting of AFC state version 621 to X+1 (1035). Having done that, either sends a state change acknowledgment message to the primary, as shown by arrow 1039. In the case of the Observer, the message is Ack message 729; in the case of the standby, the message is in reply 745 to the primary's ping. When the primary receives the message, at 1025, it sets an ACK_RECEIVED flag, persists the settings of synchronized 605 to UNSYNCH and the setting of AFC state version 621 to X+1, and resets both the ACK_PENDING and ACK_RECEIVED flags. If the state change acknowledgment message does not arrive from either the Observer or the standby both the Observer and the standby have become absent simultaneously and the primary enters STALLED state 431. State change 425 works in substantially the same fashion as state change 415.

Details of State Transition 437

This transition from UNOBSERVED SYNCHRONIZED 435 to UNOBSERVED UNSYNCHRONIZED can occur only while unobserved bit 607 is set to UNOBS in the persistent storage 510 for each of the database systems. The Observer does not set or clear Unobserved bit 607. When bit 607 is set, the standby will not execute a failover. Consequently, the primary can execute the state transition on its own, without a quorum. That being the case, the primary simply persists the setting of bit 605 to UNSYNCH and the increase of the value of AFC state version 621 from X to X+1; the new state values are propagated to the other participants by pings and ping responses; absent participants receive them as they return.

Details of Transitions 416 and 439

These transitions occur when the standby, which has been out of synchronization with the primary, again becomes synchronized. As indicated in FIG. 9, the AFC state 506 involved in the transition is synchronized bit 605, which is set to SYNCH and AFC state version 621, which is incremented. The transitions are initiated by the primary, the database requiring the quorum is the standby, and the source of the quorum is one or the other of the other participants.

The transition is shown in detail at 1001 in FIG. 10; the AFC state before the transition is shown at 1003; the state after the transition is shown at 1015. The flowchart for the primary is at 1005; the flowchart for the standby is at 1012. The transition begins when the primary detects that the standby has caught up (1007). The primary sets synchronized bit 605 to SYNCH, increases AFC state version 621 to X+1 and persists both (1009). The new state is propagated to the Observer via the primary's responses to the Observer's pings and to the standby via pings from either the Observer or standby, as shown by dashed arrow 1011. The standby and Observer respond to the new state by persisting it. Transition 439 works the same way, except that the Observer is absent, so the standby can receive the new state only via the pings from the primary.

Details of Transitions 413 and 436

These transitions occur when the standby detects a gap in the redo data it has received from the primary. The transitions cause synchronization bit 605 to be set to UNSYNCH and AFC state version value 621 to be incremented. The transitions are initiated by the standby, the database system requiring quorum is the primary, and no acknowledgement is required. The standby detects the loss of synchronization, sets and persists the new state, and propagates the new state to the other participants via responses to pings, with the other participants persisting the state when they receive the ping responses.

Details of Transition 433

This transition occurs when the primary has stalled because the standby and the Observer have become simultaneously absent and the standby returns before the Observer returns. At the time of the stall, the primary has begun transition 415 to OBSERVED UNSYNCHRONIZED state 411 but has not received an ACK yet.

Consequently, the primary is stalled with SYNC bit 521 indicating UNSYNCH, AFC state version 513 increased, and the ACK_PENDING bit set, but has not yet persisted the SYNC bit setting or the new AFC state version. In the transition, the primary additionally sets the value of unobserved bit 607 to UNOBS. The transition is initiated by the primary, which requires quorum from the standby and an acknowledgment. The sequence of events is similar to that in flowchart 1017. The primary pings the standby with pings specifying UNSYNCH, the new AFC state version, and UNOBS. When the standby returns, it determines whether the Observer is absent; if it is, it responds to the ping by persisting UNSYNCH, UNOBS, and the new AFC state and sending a state change acknowledgment to the primary. The primary responds to the acknowledgment in the ping response by setting ACK_RECEIVED, persisting the new state, and clearing ACK_PENDING and ACK_RECEIVED.

Details of Transition 425

This transition occurs when the primary has stalled and either the Observer returns before the standby does or the standby returns and the Observer then returns within the time specified by Observer threshold 633. The primary is in the condition described in the discussion of transition 433. The primary initiates the change in its response to the returned Observer's ping; when the Observer receives the response, it persists the new values for synchronized bit 605 and AFC state version 621 that it received from the primary. If the standby has returned, it may receive the new values via pings from either the primary or observer and the acknowledgment received in the primary may come either via a state change acknowledgment message 729 from the Observer or via a ping response from the standby. In response to either, the primary persists the new values for synchronized bit 605 and AFC state version 621.

Details of Transitions 405 and 407

When either the primary or the standby or both are shutdown in a planned fashion, the standby enters the SUSPEND state. As already described, when the standby is in that state, it replies to a "ready to failover" message 723 from the Observer with a "failover not accepted" reply. As shown in FIG. 4, transitions 405 and 407 may be made between SUSPENDED state 403 and any of states 411, 421, 435, and 441, i.e., at any time except during FAILOVER PENDING state 408. The primary and standby may be shut down in either order.

The DBA shuts down either database by means of an SQL shutdown command. When the DBA shuts down the standby, the standby simply transitions itself to the SUSPEND state. There is no propagation of state and no quorum needed, since the state is only entered by the standby.

When the DBA shuts down the primary, the primary sets a SHUT_INPROG bit and then waits up to 20 seconds for the primary to send a message via a ping to the standby. Because SHUT_INPROG has been set, the message in this case includes a set SUSPEND flag. The standby picks the set SUSPEND flag up via its normal state negotiation algorithm and transitions to the SUSPEND state.

Upon successful transmission of the SUSPEND flag to the standby, the primary sets a SBY_CONTACTED flag which indicates that the SUSPEND flag has been transmitted. The thread that is shutting down the primary can now resume its shutdown processing since the thread can now safely assume the standby has entered the SUSPEND state and that an automatic failover will therefore not happen.

Transition 405 from SUSPENDED to one of the other states 411, 421, 435, or 441 occurs when the primary reconnects with the standby or vice-versa. In either case, once the connection is reestablished, the primary pings the standby and the standby receives the current state of system 401 from the primary. In response to the current state, the standby resets SUSPENDED bit 609.

Note that a manual failover while in the SUSPEND state is allowed assuming all other FSFO conditions are valid for a FSFO. This accommodates the potential need to do a failover after having brought down one or both databases for maintenance and then encountered some problem on the primary. When manual failover is done in the SUSPENDED state, the SUSPENDED state is cleared after the failover is complete.

CONCLUSION

The foregoing Detailed Description has disclosed to those skilled in the relevant technologies how to implement and use Applicants' techniques for avoiding divergence between the database systems in an automatic failover configuration while increasing the availability of the configuration's primary database system and the implementation disclosed herein is the best presently known to the Applicants. It will however be immediately apparent to those skilled in the relevant technologies that many other implementations of the principles of the techniques disclosed herein are possible. To begin with, the disclosed implementation has been made in a large commercial database system which has been in continued production and development for almost 30 years. Many of the details of the disclosed implementation are consequences of the fact that the automatic failover configuration is implemented in a preexisting relational database system. Such details will of course be different in implementations of the techniques in other preexisting relational or non-relational database systems or in a newly-designed database system. Further, what is important for the techniques is the logical structure and behavior of the automatic failover configuration, rather than the specific ways in which the implementation achieves this logical structure and behavior. For example, the disclosed implementation of the configuration state is merely an example; any other implementation can be employed which provides the same behavior. The same is true as regards the techniques used for propagation of state among the participants in the automatic failover configuration, or as regards the actual implementation of carefully ordered writes.

For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

The invention claimed is:

1. An automatic failover configuration comprising: participants including
    a primary database system that processes transactions and produces redo data therefor,
    a standby database system that receives the redo data via a communications link, and
    an observer,
    each participant including a processor that has access to memory; and
    system state specifiers in the memory, the system state specifiers including a synchronized system state specifier that prevents divergence resulting from a lack of synchrony between the primary database system and the standby database system with regard to the redo data at the time of an automatic failover and
    the system state specifiers preventing the automatic failover from resulting in divergence of the database systems while permitting the primary database system to continue to process redo data when both the observer and the standby database system are absent as long as the observer and the standby database system became absent sequentially.

2. The automatic failover configuration set forth in claim 1 wherein:
    the system state specifiers prevent the automatic failover from resulting in divergence regardless of the order in which the sequential absences occur.

3. The automatic failover configuration set forth in claim 1, wherein
    the system state specifiers further comprise:
    an observed system state specifier that indicates whether the observer is present or absent, the observed system state specifier indicating that the observer is absent when the primary database system and the standby database system consider the observer to be absent;
    automatic failover will not occur if either the observed system state specifier indicates that the observer is considered to be absent or the synchronized system state specifier indicates that the standby is out of synchrony.

4. The automatic failover configuration set forth in claim 3 wherein:
    when the observed system state specifier indicates that the observer is present, the automatic failover configuration changes the observed system state specifier to indicate that the observer is not present only if the primary database system and the standby database system agree that the observer is absent.

5. The automatic failover configuration set forth in claim 4 wherein:
    when the observed system state specifier has been changed to indicate that the observer is absent, the observed system state specifier is changed to indicate that the observer is present if the primary database system determines that the observer is again present.

6. The automatic failover configuration set forth in claim 1 wherein each participant's memory includes a copy of the system state specifiers and each participant comprises:

system state transition propagation apparatus which propagates changes in the system state that originate in the participant to the other participants and responds to changes in the system state that originate in other participants by updating the participant's copy of the system state specifiers.

7. The automatic failover configuration set forth in claim 6, wherein the system state specifiers further comprise:

an observed system state specifier that indicates whether the observer is present or absent, the observed system state specifier indicating that the observer is absent when the primary database system and the standby database system consider the observer to be absent; and when the primary database system is producing redo data, the synchronized system state specifier indicates that the standby is in synchrony with the primary database system, the observed system state specifier indicates that the observer is present, and the primary database determines that the standby is no longer in synchrony, the primary's system state propagation apparatus proposes the change to another participant and changes the primary database system's synchronized system state specifier to indicate that the standby is out of synchrony only if the primary's system state propagation apparatus receives an indication that the other participant has acknowledged the change.

8. The automatic failover configuration set forth in claim 7, wherein the system state specifiers further specifies:

a failover pending system state which indicates whether a failover is pending, entry into the failover pending system state requiring that a failover condition has occurred, the synchronized system state specifier indicates that the standby is in synchrony, and the observed state specifier indicates that the observer is present, the system state propagation apparatus in the standby database system and the observer being inhibited by the failover pending system state from propagating system state to the primary database system that became absent or responding to system state received from the primary database system that became absent.

9. The automatic failover configuration set forth in claim 8 wherein:

a failover condition has occurred if the primary has become absent.

10. The automatic failover configuration set forth in claim 8 wherein:

a failover condition has occurred if the primary so indicates to the Observer.

11. The automatic failover configuration set forth in claim 8 wherein:

a failover condition has occurred if the user has requested a manual failover.

12. The automatic failover configuration set forth in claim 6 wherein:

the system state transition apparatus employs a state propagation communications link to propagate system state changes which is separate from the communications link employed to transfer redo data.

13. The automatic failover configuration set forth in claim 12 wherein:

the observer may execute on any entity that has access to the state propagation communications link.

14. The automatic failover configuration set forth in claim 6 wherein the copy of the system state specifiers in the database system participants includes a persistent copy thereof; and when a system state change can lead to divergence of a database system participant as a result of an automatic failover, the system state transition apparatus in the database participant writes the system state change to the persistent copy only if the system state transition apparatus of another participant provides quorum for the system state change.

15. The automatic failover configuration set forth in claim 14 wherein:

when the database participant initiates the system state change that can lead to divergence, the system state transition apparatus of the other participant provides the quorum via a state change acknowledgment.

16. The automatic failover configuration set forth in claim 14 wherein:

the standby database system is prevented from participating in the automatic failover when the system state specifiers indicate that operation of the standby database system is suspended.

17. The automatic failover configuration set forth in claim 1 wherein:

divergence may result from automatic failover when the participants include more than one database system that behaves as a primary database system; and such divergence is prevented by an observed system state specifier that indicates whether the observer is absent.

18. The automatic failover configuration set forth in claim 1 wherein:

the standby database system is prevented from participating in the automatic failover when the system state specifiers indicate that the observer is absent and/or the standby database system is not synchronized with the primary database system.

19. The automatic failover configuration set forth in claim 1 wherein:

the system state specifiers prevent divergence resulting from automatic failover by preventing the primary database system from affecting the system state during automatic failover.

20. A data storage device characterized in that:

the data storage device contains code which, when executed in a processor, implements the automatic failover configuration set forth in claim 1.

* * * * *